(12) United States Patent
Yi et al.

(10) Patent No.: US 10,032,083 B2
(45) Date of Patent: Jul. 24, 2018

(54) DRIVER ASSISTANCE FOR A VEHICLE

(71) Applicant: LG ELECTRONICS INC., Seoul (KR)

(72) Inventors: Chuho Yi, Seoul (KR); Woonki Park, Seoul (KR); Yeonchool Park, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 14/964,995

(22) Filed: Dec. 10, 2015

(65) Prior Publication Data

US 2016/0171315 A1 Jun. 16, 2016

(30) Foreign Application Priority Data

Dec. 10, 2014 (KR) .................. 10-2014-0177580

(51) Int. Cl.
*G06K 9/00* (2006.01)
*H04N 13/02* (2006.01)

(52) U.S. Cl.
CPC ..... *G06K 9/00798* (2013.01); *G06K 9/00791* (2013.01); *H04N 13/0203* (2013.01); *H04N 13/0271* (2013.01); *H04N 13/0296* (2013.01)

(58) Field of Classification Search
CPC .......... G06K 2209/21; G06K 9/00201; H04N 13/0203; H04N 13/0242; H04N 13/0214; G06T 2207/10012; G06T 2207/10028; G06T 2207/10021; G06T 2207/30256; G06T 7/593; G06T 7/292
See application file for complete search history.

(56) References Cited

U.S. PATENT DOCUMENTS

| | | | |
|---|---|---|---|
| 8,340,896 B2* | 12/2012 | Saito | B60W 40/072 340/438 |
| 2003/0028291 A1 | 2/2003 | Matsuura | |
| 2010/0299109 A1 | 11/2010 | Saito | |
| 2014/0268353 A1* | 9/2014 | Fujimura | G02B 27/0101 359/630 |

(Continued)

FOREIGN PATENT DOCUMENTS

| | | |
|---|---|---|
| JP | 2000-255319 | 9/2000 |
| JP | 2003-139533 | 5/2003 |
| JP | 2010-040015 | 2/2010 |

(Continued)

OTHER PUBLICATIONS

Lee et al., "Estimation of Longitudinal Profile of Road Surface from Stereo Disparity using Dijkstra Algorithm," International Journal of Control, Automation, and Systems, 12(4):895-903, Jul. 2014.

(Continued)

*Primary Examiner* — Eueng-Nan Yeh
(74) *Attorney, Agent, or Firm* — Fish & Richardson P.C.

(57) ABSTRACT

Systems and techniques are disclosed for providing driver assistance in a vehicle. A driver assistance apparatus includes a stereo camera configured to acquire stereo images of a view ahead of a vehicle, and a processor configured to generate a depth map based on the acquired stereo images and to determine whether a road segment that is within the view ahead of the vehicle is an uphill road segment or a downhill road segment based on the generated depth map.

38 Claims, 23 Drawing Sheets

(56) References Cited

U.S. PATENT DOCUMENTS

2015/0145965 A1* 5/2015 Livyatan .................. B60R 1/00
 348/47
2015/0203039 A1* 7/2015 Kaplan .................. B60R 1/025
 359/843

FOREIGN PATENT DOCUMENTS

| JP | 2014-006882 | 1/2014 |
|---|---|---|
| KR | 10-2007-0077293 | 7/2007 |
| WO | 2014/030508 | 2/2014 |

OTHER PUBLICATIONS

Partial European Search Report issued in European Application No. 15003302.5 dated Apr. 21, 2016, 9 pages.
Extended European Search Report issued in European Application No. 15003302.5 dated Jul. 12, 2016, 13 pages.
Office Action issued in Korean Application No. 10-2014-0177580, dated Jan. 5, 2016, 7 pages.
European Communication pursuant to Article 94(3) EPC in European Application No. 15003302.5, dated Mar. 31, 2017, 5 pages (with English translation).

* cited by examiner

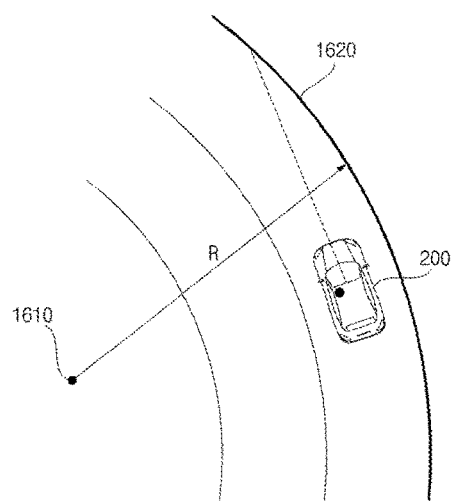
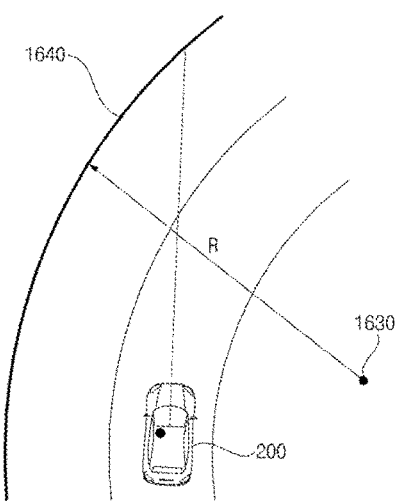
FIG. 16A
FIG. 16B

DRIVER ASSISTANCE FOR A VEHICLE

CROSS-REFERENCE TO RELATED APPLICATION

Pursuant to 35 U.S.C. § 119(a), this application claims the benefit of an earlier filing date and right of priority to Korean Patent Application No. 10-2014-0177580, filed on Dec. 10, 2014 in the Korean Intellectual Property Office, the disclosure of which is incorporated herein by reference.

TECHNICAL FIELD

The present application relates to driver assistance for a vehicle.

BACKGROUND

A vehicle is a device that allows a driver to move in a desired direction. A representative example of the vehicle may be a car.

In order to improve convenience of a user who uses the vehicle, a vehicle is typically equipped with various sensors and electronic devices. In particular, various devices to improve driving convenience of the user have been developed.

SUMMARY

Systems and techniques are disclosed that enable a driver assistance apparatus that determines whether a road ahead of a vehicle, on which the vehicle will travel, is an uphill road or a downhill road based on stereo images captured by a camera in the vehicle.

In one aspect, a driver assistance apparatus includes a stereo camera configured to acquire stereo images of a view ahead of a vehicle and a processor configured to generate a depth map based on the acquired stereo images and determine whether a road segment that is within the view ahead of the vehicle is an uphill road segment or a downhill road segment based on the generated depth map.

Implementations may include one or more of the following features. For example, the processor may be further configured to detect a road surface based on the generated depth map and determine whether the road segment that is within the view ahead of the vehicle is an uphill road segment or a downhill road segment based on the detected road surface. The processor may be further configured to detect a lane from the stereo images, determine a shape of the detected lane, and determine whether the road segment that is within the view ahead of the vehicle is an uphill road segment or a downhill road segment based on the determined shape of the detected lane.

In some examples, the processor may be further configured to determine a disappearance point indicated in the depth map and determine whether the road segment that is within the view ahead of the vehicle is an uphill road segment or a downhill road segment based on the determined disappearance point indicated in the depth map. Also, the processor may be further configured to detect a plurality of fixed objects around the road segment indicated in the generated depth map and determine whether the road segment that is within the view ahead of the vehicle is an uphill road segment or a downhill road segment based on the detected plurality of fixed objects around the road segment indicated in the generated depth map.

In some implementations, the driver assistance apparatus may include a stereo camera drive unit configured to drive the stereo camera and the processor may be configured to control the stereo camera drive unit based on a determination of whether the road segment that is within the view ahead of the vehicle is an uphill road segment or a downhill road segment. In these implementations, the processor may be further configured to determine that the road segment that is within the view ahead of the vehicle is an uphill road segment and, based on a determination that the road segment that is within the view ahead of the vehicle is an uphill road segment, determine a tilt of the uphill road segment and control the stereo camera to be tilted upward according to the determined tilt of the uphill road segment.

In some examples, the processor may be further configured to determine that the road segment that is within the view ahead of the vehicle is an uphill road segment and, based on a determination that the road segment that is within the view ahead of the vehicle is an uphill road segment, determine a travelling speed of the vehicle and control the stereo camera to be tilted upward at a speed that is proportional to the determined traveling speed of the vehicle. In these examples, the processor may be further configured to determine that a distance between the vehicle and an inflection point of the uphill road segment is at least a predetermined distance and, based on a determination that the distance between the vehicle and the inflection point of the uphill road segment is at least the predetermined distance, control the stereo camera to be tilted upward according to the determined tilt of the uphill road segment.

Also, the processor may be further configured to determine that the vehicle has entered the uphill road segment and, based on a determination that the vehicle has entered the uphill road segment, control the stereo camera to return to a state in which the stereo camera is not tilted. In addition, the processor may be configured to determine a travelling speed of the vehicle and control, in proportion to the determined traveling speed of the vehicle and according to the determined tilt of the uphill road segment, a speed of the stereo camera to return to the state in which the stereo camera is not tilted. Further, the processor may be further configured to determine that the road segment that is within the view ahead of the vehicle is a downhill road segment and, based on a determination that the road segment that is within the view ahead of the vehicle is a downhill road segment, determine a tilt of the downhill road segment and control the stereo camera to be tilted downward according to the determined tilt of the downhill road segment.

In some implementations, the processor may be further configured to determine that the road segment that is within the view ahead of the vehicle is a downhill road segment and, based on a determination that the road segment that is within the view ahead of the vehicle is a downhill road segment, determine a travelling speed of the vehicle and control the stereo camera to be tilted downward at a speed that is proportional to the determined traveling speed of the vehicle. In these implementations, the processor may be configured to determine that a distance between the vehicle and an inflection point of the downhill road segment is at least a predetermined distance and, based on a determination that the distance between the vehicle and an inflection point of the downhill road segment is at least a predetermined distance, control the stereo camera to be tilted downward according to the determined tilt of the downhill road segment.

In some examples, the processor may be configured to determine that the vehicle has entered the downhill road segment and the stereo camera drive unit may be configured to, based on a determination that the vehicle has entered the downhill road segment, drive the stereo camera to return to a state in which the stereo camera is not tilted. In these examples, the processor may be configured to determine a travelling speed of the vehicle and control, according to the determined tilt of the downhill road segment or in proportion to the determined traveling speed of the vehicle, the stereo camera to return to the state in which the stereo camera is not tilted.

In some implementations, the processor may be further configured to detect lines in the acquired stereo images and generate, based on the detected lines, information regarding a curve of the road segment that is within the view ahead of the vehicle. In some implementations, the driver assistance apparatus may include a stereo camera drive unit configured to drive the stereo camera. In these implementations, the processor may be further configured to determine, based on the generated information regarding a curve of the road segment that is within the view ahead of the vehicle, that the road segment that is within the view ahead of the vehicle is curved to the right or the left in a direction of travel of the vehicle, detect an outermost line among the detect lines that is most distant from a center of curvature of the road segment that is within the view ahead of the vehicle, detect a tilt of the outermost line, and control the stereo camera drive unit to tilt the stereo camera upward or downward according to the detected tilt of the outermost line.

Also, the driver assistance apparatus may include a display unit configured to output information regarding the determined uphill road segment or the determined downhill road segment that is within the view ahead of the vehicle. In addition, the driver assistance apparatus may include a first memory, and the processor may be further configured to cumulatively store, in the first memory, information regarding a state of the vehicle based on the determined uphill road segment or the determined downhill road segment that is within the view ahead of the vehicle.

In another aspect, a vehicle includes a brake drive unit configured to drive a brake of the vehicle and a stereo camera configured to acquire stereo images for a view ahead of the vehicle. The vehicle also includes a processor configured to generate a depth map based on the acquired stereo images, determine, based on the generated depth map, whether a road segment that is within the view ahead of the vehicle is an uphill road segment or a downhill road segment, generate road surface information based on the acquired stereo images, and output a control signal configured to control the brake drive unit based on the determined uphill road segment or the determined downhill road segment that is within the view ahead of the vehicle and based on the generated road surface information.

Implementations may include one or more of the following features. For example, the vehicle may include a navigation system configured to provide a map and information regarding a position of the vehicle on the map. In this example, the processor may be configured to receive, from the navigation system, information regarding the road segment on which the vehicle is traveling excluding a region of the road segment displayed in the stereo images and estimate, based on the received information regarding the road segment on which the vehicle is traveling excluding a region of the road segment displayed in the stereo images, a state of the road segment.

In some implementations, the vehicle may include a slip determination unit configured to determine a slip degree of the vehicle. In these implementations, the processor may be further configured to output the control signal to control the brake drive unit of the vehicle based on the determined uphill road segment or the determined downhill road segment that is within the view ahead of the vehicle and based on the determined slip degree of the vehicle. Also, in these implementations, the vehicle may includes a first memory and a power source drive unit configured to control an output of an engine of the vehicle, where the output of the engine is configured to limit a speed of the vehicle. Further, in these implementations, the processor may be further configured to cumulatively store, in the first memory, information regarding the determined uphill road segment or the determined downhill road segment that is within the view ahead of the vehicle, apply a Kalman filter to the cumulatively stored information regarding the determined uphill road segment or the determined downhill road segment, estimate the slip degree of the vehicle based on an application of the Kalman filter to the cumulatively stored information regarding the determined uphill road segment or the determined downhill road segment, and output the control signal to control, based on the estimated slip degree of the vehicle, the power source drive unit or the brake drive unit to drive the brake of the vehicle at a level equivalent to 90% or less than a full brake level.

In yet another aspect, a driver assistance method includes acquiring, by a stereo camera of a vehicle, stereo images of a view ahead of the vehicle and generating a depth map based on the acquired stereo images. The method also includes determining whether a road segment that is within the view ahead of the vehicle is an uphill road segment or a downhill road segment based on the generated depth map.

Implementations may include one or more of the following features. For example, the method may include detecting a road surface from the generated depth map and determining whether the road segment that is within the view ahead of the vehicle is an uphill road segment or a downhill road segment based on the detected road surface. Also, the method may include detecting a lane from the stereo images, determining a shape of the detected lane, and determining whether the road segment that is within the view ahead of the vehicle is an uphill road segment or a downhill road segment based on the determined shape of the detected lane.

In addition, the method may include determining a disappearance point indicated in the depth map and determining whether the road segment that is within the view ahead of the vehicle is an uphill road segment or a downhill road segment based on the determined disappearance point indicated in the depth map. Further, the method may include detecting a plurality of fixed objects around the road segment indicated in the depth map and determining whether the road segment that is within the view ahead of the vehicle is an uphill road segment or a downhill road segment based on the detected plurality of fixed objects around the road segment indicated in the depth map.

In some implementations, the method may include controlling a stereo camera drive unit to drive the stereo camera based on a determination of whether the road segment that is within the view ahead of the vehicle is an uphill road segment or a downhill road segment. In these implementations, the method may include determining that the road segment that is within the view ahead of the vehicle is an uphill road segment and, based on a determination that the road segment that is within the view ahead of the vehicle is an uphill road segment, determining a tilt of the uphill road segment. Further, in these implementations, the method may include driving the stereo camera to be tilted upward according to the determined tilt of the uphill road segment.

In some examples, the method may include determining that the road segment that is within the view ahead of the vehicle is an uphill road segment and, based on a determination that the road segment that is within the view ahead of the vehicle is an uphill road segment, determining a travelling speed of the vehicle and driving the stereo camera to be tilted upward at a speed that is proportional to the determined traveling speed of the vehicle. In these examples, the method may include determining that a distance between the vehicle and an inflection point of the uphill road segment is at least a predetermined distance and, based on a determination that the distance between the vehicle and the inflection point of the uphill road segment is at least the predetermined distance, driving the stereo camera to be tilted upward according to the determined tilt of the uphill road segment.

In some implementations, the method may include determining that the vehicle has entered the uphill road segment and, based on a determination that the vehicle has entered the uphill road segment, driving the stereo camera to return to a state in which the stereo camera is not tilted. In these implementations, the method may include determining a travelling speed of the vehicle and driving, in proportion to the determined traveling speed of the vehicle and according to the determined tilt of the uphill road segment, the stereo camera to return to the state in which the stereo camera is not tilted.

Also, the method may include determining that the road segment that is within the view ahead of the vehicle is a downhill road segment and, based on a determination that the road segment that is within the view ahead of the vehicle is a downhill road segment, determining a tilt of the downhill road segment. The method further may include driving the stereo camera to be tilted downward according to the determined tilt of the downhill road segment.

In some examples, the method may include determining that the road segment that is within the view ahead of the vehicle is a downhill road segment and, based on a determination that the road segment that is within the view ahead of the vehicle is a downhill road segment, determining a travelling speed of the vehicle and driving the stereo camera to be tilted downward at a speed that is proportional to the determined traveling speed of the vehicle. In addition, the method may include determining that a distance between the vehicle and an inflection point of the downhill road segment is at least a predetermined distance and, based on a determination that the distance between the vehicle and an inflection point of the downhill road segment is at least a predetermined distance, driving the stereo camera to be tilted downward according to the determined tilt of the downhill road segment.

In some implementations, the method may include determining that the vehicle has entered the downhill road segment and, based on a determination that the vehicle has entered the downhill road segment, driving the stereo camera to return to a state in which the stereo camera is not tilted. In these implementations, the method may includes determining a travelling speed of the vehicle and driving, according to the determined tilt of the downhill road segment or in proportion to the determined traveling speed of the vehicle, the stereo camera to return to the state in which the stereo camera is not tilted.

In some examples, the method may include detecting lines in the acquired stereo images and generating, based on the detected lines, information regarding a curve of the road segment that is within the view ahead of the vehicle. In these examples, the method may include controlling a stereo camera drive unit to drive the stereo camera, determining, based on the generated information regarding a curve of the road segment that is within the view ahead of the vehicle, that the road segment that is within the view ahead of the vehicle is curved to the right or the left in a direction of travel of the vehicle, detecting an outermost line among the detect lines that is most distant from a center of curvature of the road segment that is within the view ahead of the vehicle, detecting a tilt of the outermost line, and controlling the stereo camera drive unit to tilt the stereo camera upward or downward according to the detected tilt of the outermost line.

The method may include outputting, to a display unit, information regarding the determined uphill road segment or the determined downhill road segment that is within the view ahead of the vehicle. The method also may include cumulatively storing, in a first memory, information regarding a state of the vehicle based on the determined uphill road segment or the determined downhill road segment that is within the view ahead of the vehicle. The method further may include controlling a brake drive unit to drive a brake of the vehicle, generating road surface information based on the acquired stereo images, and outputting a control signal configured to control the brake drive unit based on the determined uphill road segment or the determined downhill road segment that is within the view ahead of the vehicle and based on the generated road surface information. In addition, the method may include receiving, from a navigation system that is configured to provide a map and information regarding a position of the vehicle on the map, information regarding the road segment on which the vehicle is traveling excluding a region of the road segment displayed in the stereo images from a navigation system and estimating, based on the received information regarding the road segment on which the vehicle is traveling excluding a region of the road segment displayed in the stereo images, a state of the road segment.

In some implementations, the method may include determining a slip degree of the vehicle and outputting the control signal to control the brake drive unit of the vehicle based on the determined uphill road segment or the determined downhill road segment that is within the view ahead of the vehicle and based on the determined slip degree of the vehicle. In these implementations, the method may include controlling an output of an engine of the vehicle through a power source drive unit of the vehicle, wherein the output of the engine is configured to limit a speed of the vehicle, cumulatively storing, in a first memory, information regarding the determined uphill road segment or the determined downhill road segment that is within the view ahead of the vehicle, applying a Kalman filter to the cumulatively stored information regarding the determined uphill road segment or the determined downhill road segment, estimating the slip degree of the vehicle based on an application of the Kalman filter to the cumulatively stored information regarding the determined uphill road segment or the determined downhill road segment, and outputting the control signal to control, based on the estimated slip degree of the vehicle, the power source drive unit or the brake drive unit to drive the brake of the vehicle at a level equivalent to 90% or less than a full brake level.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIGS. 16A and 16B are diagrams illustrating examples of an operation of a driver assistance apparatus in a scenario in which a road ahead of a vehicle is a curved uphill road or a curved downhill road.

DETAILED DESCRIPTION

In recent years, interest in an autonomous car, i.e. a self-driving car, has increased, and therefore research has been actively conducted into a sensor equipped in the autonomous car. Examples of the sensor equipped in the autonomous car may include a camera, an infrared sensor, a radio detection and ranging (radar) sensor, a global positioning system (GPS) sensor, a light detection and ranging (lidar) sensor, and a gyroscope. Among them, a camera may perform important functions as a sensor to detect objects or environmental conditions around a vehicle.

Information regarding a road ahead of a vehicle during traveling of the vehicle may be acquired through a navigation system. However, it is not possible to acquire correct information regarding whether the road ahead of the vehicle is an uphill or a downhill. Consequently, there is a high necessity for research on acquisition of information regarding whether the road ahead of the vehicle is the uphill or the downhill and controlling of a unit equipped in the vehicle.

Systems and techniques are disclosed that enable a driver assistance apparatus to determine whether a road ahead of a vehicle, on which the vehicle will travel, is an uphill road or a downhill road based on stereo images captured by a camera in the vehicle.

A vehicle as described in this specification may include a car and a motorcycle, but implementations are not necessarily limited thereto, and may generally include any suitable vehicle that transports people. Hereinafter, a description will be given based on a car.

A vehicle as described in this application may include a vehicle equipped with an engine, a hybrid vehicle equipped with an engine and an electric motor, an electric vehicle equipped with an electric motor, or generally a vehicle that is motorized by any suitable power source. Hereinafter, a description will be given based on a vehicle equipped with an engine.

In some implementations, a driver assistance apparatus may be an advanced driver assistance system (ADAS) or an advanced driver assistance apparatus (ADAA). Hereinafter, a description will be given of various examples of a driver assistance apparatus and a vehicle including the same.

For ease of description in the present disclosure, an X axis may refer to a direction in which an overall width of a vehicle is measured, a Y axis may refer to a direction in which an overall height of the vehicle is measured, and a Z axis may refer to a direction in which an overall length of the vehicle is measured.

Figure 1:
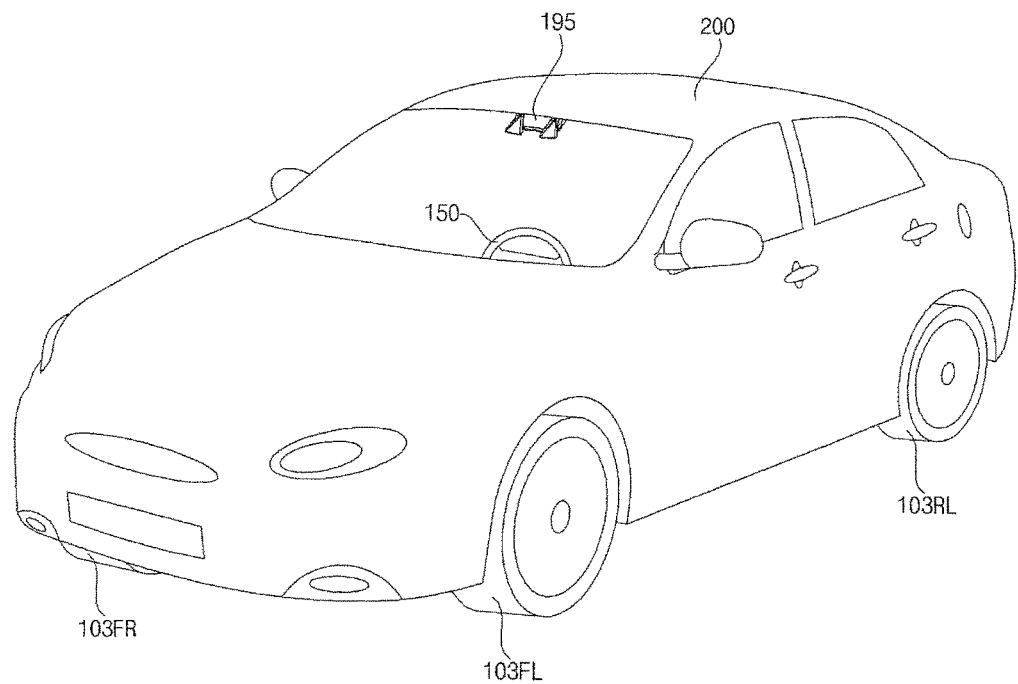
FIG. 1 is a diagram illustrating an example of a vehicle equipped with a stereo camera.

FIG. 1 is a diagram illustrating an example of a vehicle equipped with a stereo camera.

Referring to FIG. 1, a vehicle 200 may include wheels 103FR, 103FL, 103RL, etc. configured to be rotated by a power source, a steering wheel 150 configured to control a movement direction of the vehicle 200, and a stereo camera 195 provided in the vehicle 200.

The stereo camera 195 may include one or more cameras. Stereo images acquired by the cameras may be signal-processed in a driver assistance apparatus 100 (see, e.g., FIG. 3).

The example of FIG. 1 shows, by way of example, that the stereo camera 195 includes two cameras.

In present disclosure, the stereo camera 195 may also be referred to as a stereo camera module 195.

Figure 2:
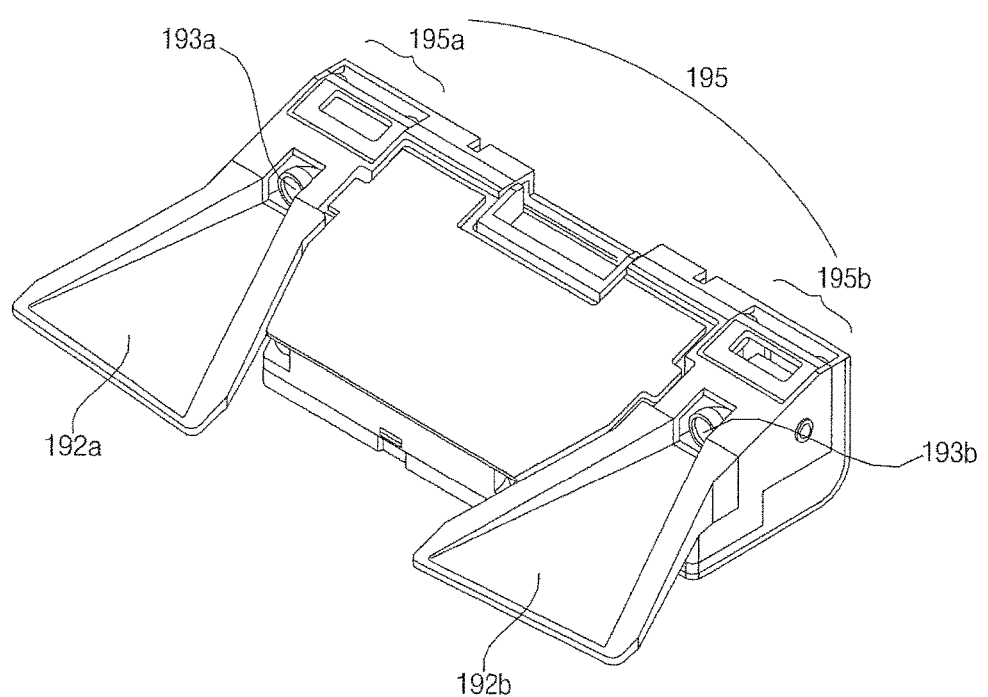
FIG. 2 is a diagram illustrating an example of a stereo camera attached to a vehicle.

FIG. 2 is a diagram illustrating an example of a stereo camera attached to a vehicle (e.g., the vehicle shown in FIG. 1).

Referring to the example in FIG. 2, the stereo camera module 195 may include a first camera 195a having a first lens 193a and a second camera 195b having a second lens 193b.

The stereo camera module 195 may also be referred to as a stereo image acquisition device.

In some implementations, the stereo camera module 195 may further include a first light shield unit 192a to shield light incident upon the first lens 193a and a second light shield unit 192b to shield light incident upon the second lens 193b.

The stereo camera module 195 shown in FIG. 2 may be detachably attached to a ceiling or a windshield of the vehicle 200.

A driver assistance apparatus 100 (see, e.g., FIG. 3) equipped with the stereo camera module 195 with the above-stated construction may acquire stereo images for a view ahead of the vehicle from the stereo camera module 195, detect disparity based on the stereo images, detect an object for at least one of the stereo images based on disparity information, and continuously track motion of the object after detection of the object.

Figure 3A:
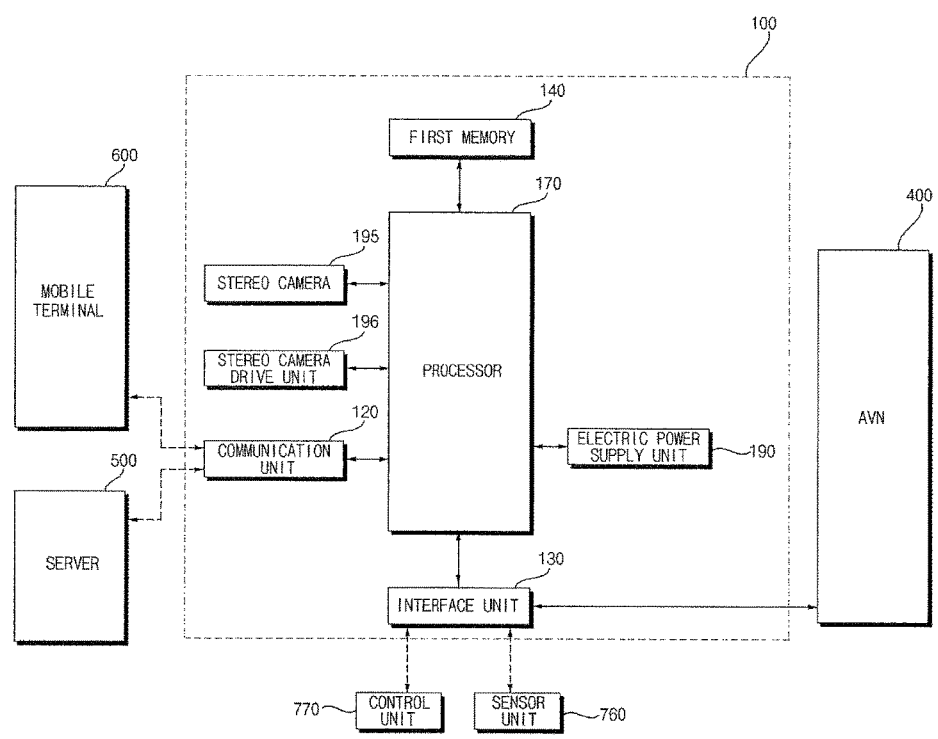
FIGS. 3A and 3B are internal block diagrams illustrating various examples of a driver assistance apparatus.
Figure 3B:
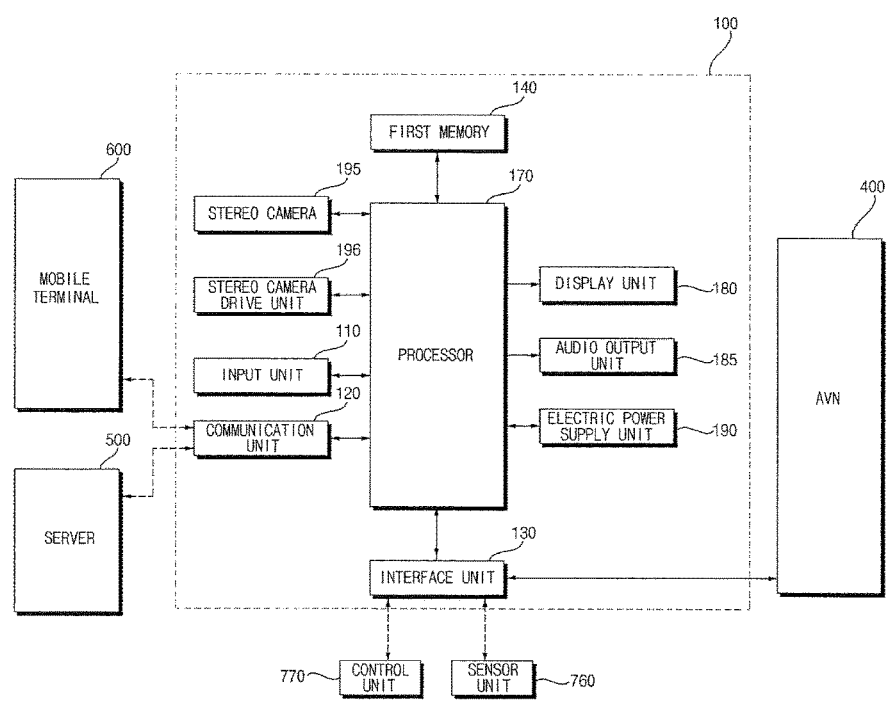

FIGS. 3A and 3B are internal block diagrams showing various examples of a driver assistance apparatus.

Referring to the examples in FIGS. 3A and 3B, a driver assistance apparatus 100 may perform signal-processing of stereo images received from the stereo camera 195 (e.g., based on computer vision) to create vehicle-related information. The vehicle-related information may include vehicle control information for direct control of the vehicle or driver assistance information for driving guidance provided to a driver.

Referring first to the example in FIG. 3A, the driver assistance apparatus 100 of FIG. 3A may include a communication unit 120, an interface unit 130, a first memory 140, a processor 170, an electric power supply unit 190, a stereo camera 195, and a stereo camera drive unit 196. The stereo camera drive unit 196 may also be referred to as a stereo camera drive device.

The communication unit 120 may exchange data with a mobile terminal 600 or a server 500 in a wireless fashion. For example, the communication unit 120 may exchange data with a mobile terminal of the driver (e.g., in a wireless fashion). Any suitable wireless data communication protocol may be used, such as Bluetooth, Wi-Fi, Wi-Fi Direct, and/or Automotive Pixel Link (APiX).

The communication unit 120 may receive various types of information, such as weather information and/or road traffic state information such as Transport Protocol Expert Group (TPEG) information, from the mobile terminal 600 or the server 500. In some implementations, the communication unit 120 may transmit real-time traffic information acquired by the driver assistance apparatus 100 based on stereo images to the mobile terminal 600 or the server 500.

When a user gets into the vehicle, a mobile terminal 600 of the user may pair with the driver assistance apparatus 100, for example automatically or by the user executing an application.

The interface unit 130 may receive vehicle-related data or transmit a signal processed or created by the processor 170 to the outside of the vehicle. To this end, the interface unit 130 may perform data communication with a control unit 770, an audio video navigation (AVN) apparatus 400, and/or a sensor unit 760 in the vehicle in a wired communication fashion or a wireless communication fashion.

The interface unit 130 may receive map information related to vehicle travel through data communication with the AVN apparatus 400. For example, the AVN apparatus 400 may include a navigation system, and the interface unit 130 may receive a map and information regarding the position of the vehicle on the map from the navigation system and transmit the map and the vehicle position information to the processor 170.

In some implementations, the interface unit 130 may receive sensor information from the control unit 770 and the sensor unit 760.

The sensor information may include information regarding at least one of slip vehicle degree, vehicle heading information, vehicle position information (global positioning system (GPS) information), vehicle angle information, vehicle speed information, vehicle acceleration information, vehicle tilt information, vehicle forward movement/backward movement information, battery information, fuel information, tire information, vehicle lamp information, in-vehicle temperature information, and/or in-vehicle humidity information.

The sensor information may be acquired by at least one of a wheel speed sensor, a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, or an in-vehicle humidity sensor. The position module may include a GPS module to receive GPS information.

Of the above-specified sensor information, some information may be related to vehicle travel. For example, the vehicle heading information, the vehicle position information, the vehicle angle information, the vehicle speed information, and the vehicle tilt information, which are related to vehicle travel, may be referred to as vehicle travel information.

The first memory 140 may store various data and information for overall operation of the driver assistance apparatus 100, such as computer-readable programs for processing or control of the processor 170.

In some implementations, an audio output unit may convert an electric signal received from the processor 170 into an audio signal and output the audio signal. In such scenarios, the audio output unit may include a speaker, for example. The audio output unit may output a sound corresponding to the operation of an input unit, e.g., a user pressing a button.

In some implementations, an audio input unit may receive a user's voice. In such scenarios, the audio input unit may include a microphone, for example. The received voice may be converted into an electric signal, which may be transmitted to the processor 170.

The processor 170 may, in some cases, control overall operation of each unit in the driver assistance apparatus 100.

The processor 170 may perform signal processing on images that have been captured by the stereo camera 195, for example based on computer vision. In such scenarios, the processor 170 may process stereo images for a view in a direction ahead of the vehicle that have been captured from the stereo camera 195. The processor 170 may perform signal processing on the images. Such signal processing may include, for example, calculating a disparity for the view ahead of the vehicle based on the stereo images, detecting an object for at least one of the stereo images based on the calculated disparity information, and/or tracking (e.g., continuously) a motion of the object after detection of the object.

In some implementations, during detection of an object in a frame that has been captured by the stereo camera 195, the processor 170 may execute various operations for detecting the object in the frame. Such object detection operations may include, for example, lane detection (LD), adjacent vehicle detection (VD), pedestrian detection (PD), bright spot detection (BD), traffic sign recognition (TSR), and/or road surface detection.

In addition, the processor 170 may, in some implementations, calculate the distance to the detected object (e.g., an adjacent vehicle), a speed of the detected adjacent vehicle, and a difference in speed with the detected adjacent vehicle.

In some implementations, the processor 170 may create a depth map based on stereo images and determine whether a road ahead of the vehicle, on which the vehicle will travel, is an uphill or a downhill, based on the created depth map. In this case, the processor 170 may function as an uphill/downhill determination device.

For example, the processor 170 may detect a road surface from the stereo images or the depth map and determine whether the road ahead of the vehicle is the uphill or the downhill based on the detected road surface.

As another example, the processor 170 may detect a lane from the stereo images or the depth map and determine whether the road ahead of the vehicle is the uphill or the downhill based on the shape of the detected lane.

As another example, the processor 170 may determine whether the road ahead of the vehicle is the uphill or the downhill based on a disappearance point indicated in the stereo images or the depth map.

As another example, the processor 170 may determine whether the road ahead of the vehicle is the uphill or the downhill based on a plurality of fixed objects around the road indicated in the stereo images or the depth map.

In some implementations, the processor 170 may detect a lane or a line from the stereo images or the depth map and create information regarding a curve of the road based on the detected lane or line. In this case, the processor 170 may function as a curve information creation device. For example, the processor 170 may detect a lane based on lane-dividing lines located at opposite sides of the vehicle which is traveling on the road and create information regarding a curve of the road. Alternatively, the processor 170 may detect a lane based on the central line of the road and create information regarding a curve of the road. For example, the processor 170 may detect a lane through Hough transformation and create information regarding a curve of the road. The information regarding the curve of the road may include curvature of the road.

In some implementations, the processor 170 may cumulatively store information regarding the determined uphill or downhill of the road ahead of the vehicle in the first memory 140. In this case, the processor 170 may function as a storage device. The processor 170 may apply one or more processing techniques, such as a Kalman filter, to the cumulatively stored information regarding the uphill or the downhill of the road ahead of the vehicle. In this case, the processor 170 may estimate a vehicle slip degree based on the uphill or downhill information to which the Kalman filter has been applied. In this case, the processor 170 may function as a vehicle slip degree estimation device. For example, the processor 170 may receive data cumulatively stored in a state in which the uphill or downhill information is matched with the slip information through the interface unit 130. The processor 170 may estimate a vehicle slip degree corresponding to the uphill or downhill to which the Kalman filter has been applied based on the received matching information. The processor 170 may output a control signal to control a power source drive unit or a brake drive unit to the control unit 770 such that a brake can be driven at a level equivalent to a fraction (e.g., 90% or less) of a full brake (which means a case in which the brake is fully driven) based on the estimated slip degree.

In some implementations, the processor 170 may output the information regarding the uphill or the downhill of the road ahead of the vehicle through a display unit 180. In this case, the processor 170 may function as an output device. The processor 170 may graphically process the motion of the stereo camera 195 corresponding to the uphill or the downhill of the road ahead of the vehicle and output the graphically-processed motion of the stereo camera 195 through the display unit 180.

The processor 170 may cumulatively store a state of the vehicle based on the uphill or the downhill of the road ahead of the vehicle in the first memory 140. For example, the processor 170 may cumulatively store the motion of the stereo camera 195 corresponding to a tilt of the uphill of the road ahead of the vehicle or a tilt of the downhill of the road ahead of the vehicle in the first memory 140. In this case, the processor 170 may apply a Kalman filter based on the cumulatively stored information regarding the motion of the stereo camera 195. In a case in which the Kalman filter is applied, it the processor 170 may be able to accurately control the motion of the stereo camera 195.

In some implementations, the processor 170 may generate information regarding the road surface on which the vehicle is traveling based on the stereo images. For example, the processor 170 may classify a state of the road surface into one of several states, such as a dry state, a wet state, a snowy state, and a frozen state based on the stereo images. In some implementations, this classification may be performed based on differences in brightness data of the stereo images. For example, the snowy state may have the highest brightness level, and the dry state, the frozen state, and the wet state may have sequentially lower brightness levels. As described above, therefore, the state of the road surface may be classified into the dry state, the wet state, the snowy state, and the frozen state based on the brightness. In another example, the processor 170 of the driver assistance apparatus 100 may classify the road surface data into the dry state, the wet state, the snowy state, and the frozen state based on intensity and exposure of the images. The processor 170 may output a control signal to control the brake drive unit to the control unit 770 based on the uphill or the downhill of the road ahead of the vehicle and road surface information.

The processor 170 may receive various types of information from different components of the vehicle. For example, the processor 170 may receive weather information and road traffic state information, such as TPEG information, through the communication unit 120.

As another example, the processor 170 may acquire, in real time, traffic-around-vehicle state information acquired by the driver assistance apparatus 100 based on stereo images.

As another example, the processor 170 may receive map information from the AVN apparatus 400 through the interface unit 130.

As another example, the processor 170 may receive sensor information from the control unit 770 or the sensor unit 760 through the interface unit 130. The sensor information may include information regarding at least one of vehicle slip information, vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information. In addition, the processor 170 may receive control information of each unit provided in the vehicle from the control unit 770 through the interface unit 130.

In addition, the processor 170 may receive information regarding the road on which the vehicle 200 is traveling excluding a region of the road displayed in the stereo images from the navigation system to estimate a state of the road. In this case, the processor 170 may function as a road state estimation device. As a specific example, the processor 170 may estimate a state of the road ahead of the vehicle or at the rear of the vehicle which is not displayed in the stereo images. The road state may include a curve of the road, a tunnel, and/or a number of lanes in the road.

In some cases, the processor 170 may be implemented using digital signal processors (DSPs), application specific integrated circuits (ASICs), or micro-controllers. The processor 170 may be mounted on one surface of a predetermined circuit board.

The electric power supply unit 190 may supply electric power to the respective components under control of the processor 170. As a specific example, electric power from an in-vehicle battery may be supplied to the electric power supply unit 190.

The stereo camera 195 may include a plurality of cameras. In the following example, the stereo camera 195 includes two cameras as previously described with reference to FIG. 2.

The stereo camera 195 may be detachably attached to a ceiling or a windshield of the vehicle 200. The stereo camera 195 may include a first camera 195a having a first lens 193a and a second camera 195b having a second lens 193b.

In some implementations, the stereo camera 195 may further include a first light shield unit 192a to shield light incident upon the first lens 193a and a second light shield unit 192b to shield light incident upon the second lens 193b.

The stereo camera drive unit 196 may drive the stereo camera 195 under control of the processor 170. For example, the stereo camera drive unit 196 may include a drive unit, such as a motor, which may move the stereo camera 195 upward and downward and from side to side under control of the processor 170. In this case, the stereo camera drive unit 196 may include a drive force transmission unit to transmit drive force generated by the drive means to the stereo camera 195.

For example, the stereo camera drive unit 196 may tilt or pan the stereo camera 195.

Referring now to the example in FIG. 3B, a driver assistance apparatus 100 of FIG. 3B may further include an input unit 110, a display unit 180, and an audio output unit 185 as compared with the example of a driver assistance apparatus 100 of FIG. 3A. Hereinafter, a description will be given of only the input unit 110, the display unit 180, and the audio output unit 185.

The input unit 110 may include an interface, such as a plurality of buttons or a touchscreen, attached to the driver assistance apparatus 100, and in some cases, specifically attached to the stereo camera 195. The driver assistance apparatus 100 may be powered-on through by a user operating the plurality of buttons or the touchscreen such that the driver assistance apparatus 100 can be operated. In some implementations, various input operations may be executed additionally or alternatively through the input unit 110.

The audio output unit 185 outputs a sound based on an audio signal processed by the processor 170 to an outside of the vehicle. In such scenarios, the audio output unit 185 may include at least one speaker.

The display unit 180 may display an image related to the operation of the driver assistance apparatus. In order to display such an image, the display unit 180 may include a cluster or a head up display (HUD) provided at the inside front of the vehicle. In a case in which the display unit 180 is a HUD, the display unit 180 may include a projection module to project an image on the windshield of the vehicle 200.

Figure 4A:
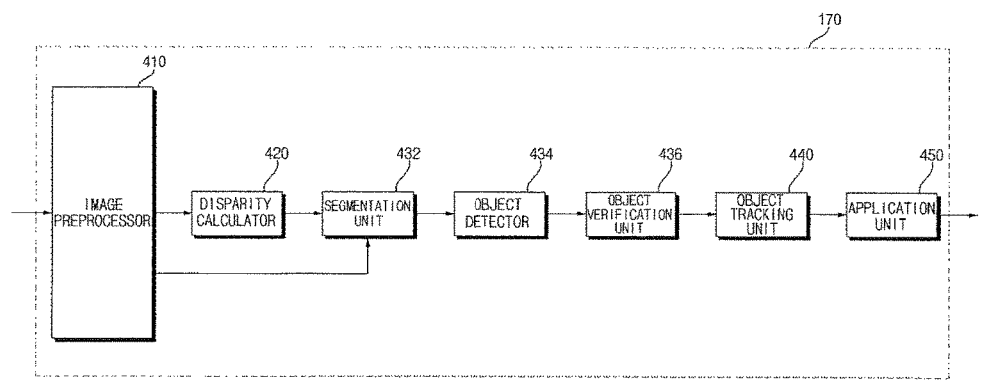
FIGS. 4A, 4B, and 4C are internal block diagrams illustrating various examples of a processor of a driver assistance apparatus.
Figure 4B:
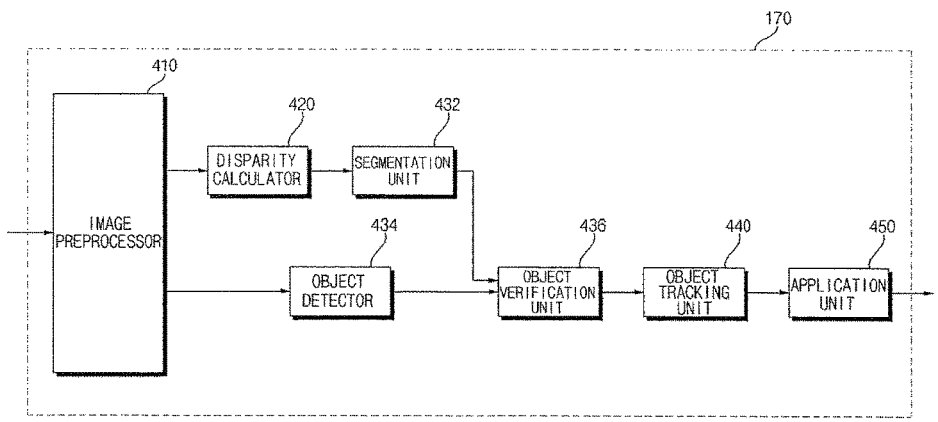
Figure 4C:
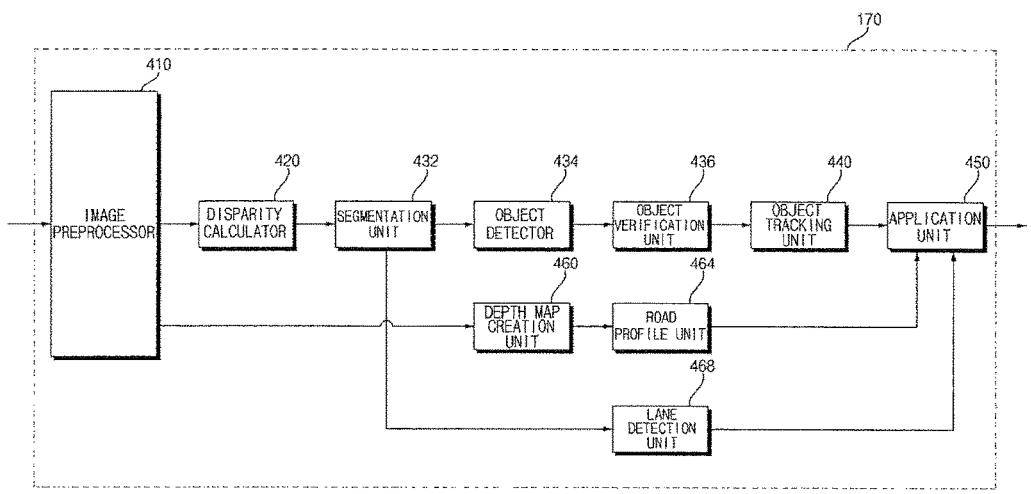
Figure 5A:
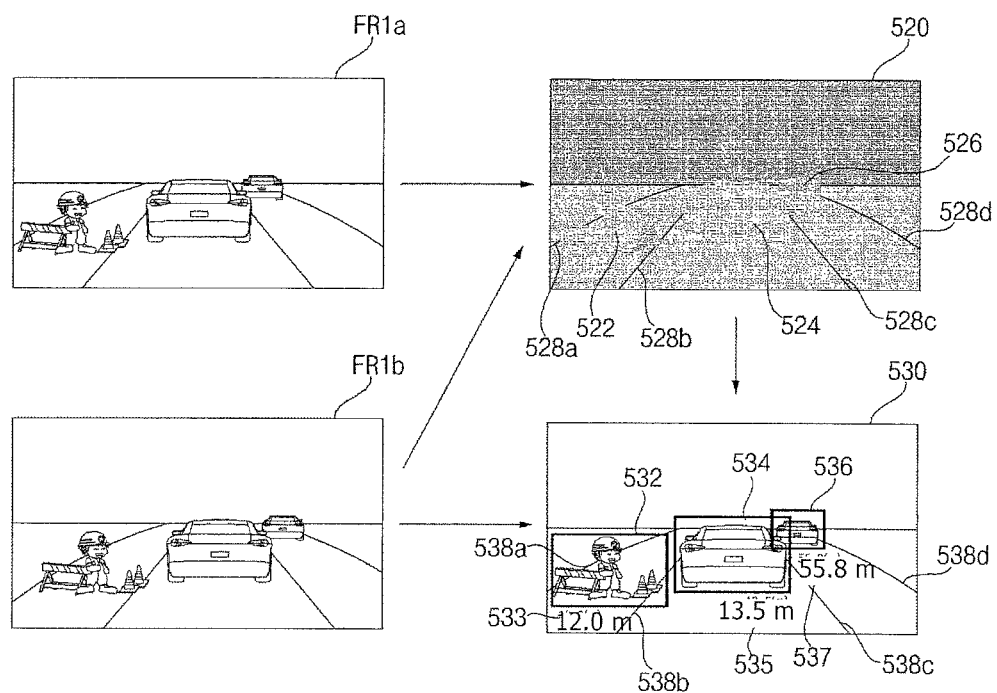
FIGS. 5A and 5B are diagrams illustrating examples of operations of a processor of a driver assistance apparatus.
Figure 5B:
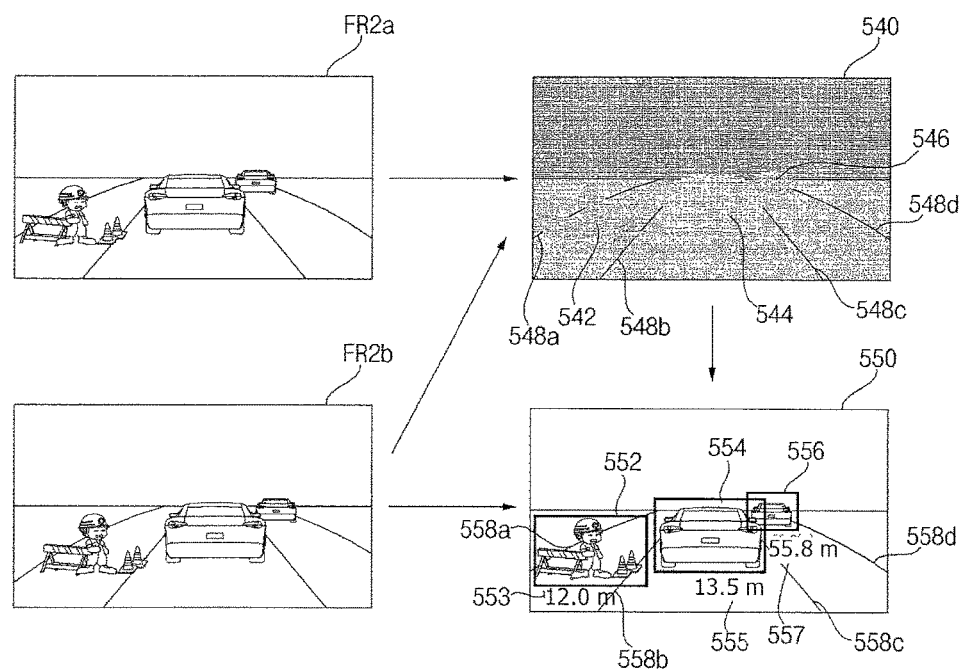

FIGS. 4A to 4C are internal block diagrams showing various examples of a processor (e.g., the processors shown in FIGS. 3A and 3B). FIGS. 5A and 5B are reference views illustrating examples of operations of a processor (e.g., the processors shown in FIGS. 4A and 4B).

Referring first to FIG. 4A, which is an internal block diagram showing an example of the processor 170, the processor 170 of the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 receives stereo images from the stereo camera 195 and preprocesses the received stereo images.

In some implementations, the image preprocessor 410 may perform noise reduction, rectification, calibration, color enhancement, color space conversion (CSC), interpolation, and/or camera gain control for the stereo images. As a result, in some scenarios, the image preprocessor 410 may perform various types of processing to enhance the stereo images (e.g., make the images more vivid) that were taken by the stereo camera 195.

The disparity calculator 420 receives the stereo images signal-processed by the image preprocessor 410, performs stereo matching for the received stereo images, and acquires a disparity map based on the stereo matching. For example, the disparity calculator 420 may acquire disparity information of stereo images for a view in a direction ahead of the vehicle.

The stereo matching may be performed on a per pixel basis or a per predetermined block basis of the stereo images. In some implementations, the disparity map may include a map showing binocular parallax information of stereo images, e.g., left and right images, as values.

The segmentation unit 432 may perform segmentation and clustering for at least one of the stereo images based on the disparity information from the disparity calculator 420.

In some cases, the segmentation unit 432 may segment at least one of the stereo images into a background and a foreground based on the disparity information.

For example, a region of the image in which the disparity information in the disparity map is less than or equal to a predetermined value may be determined to be a background, and the calculated region may be excluded. As a result, a foreground may be relatively separated from the stereo images.

In another example, a region of the image in which the disparity information in the disparity map is greater than or equal to a predetermined value may be determined to be a foreground, and the calculated region may be extracted. As a result, the foreground may be separated from the stereo images.

As described in the examples above, the stereo images may be segmented into a background and a foreground based on the disparity information extracted based on the stereo images. Subsequently, therefore, signal processing speed and signal processing amount may be reduced during detection of an object.

The object detector 434 may detect an object based on the image segment from the segmentation unit 432.

As an example, the object detector 434 may detect an object for at least one of the stereo images based on the disparity information.

Specifically, the object detector 434 may detect an object for at least one of the stereo images. For example, the object detector 434 may detect an object from a foreground separated from the stereo image by the image segmentation.

Subsequently, the object verification unit 436 classifies and verifies the separated object.

To this end, the object verification unit 436 may use any suitable recognition method(s), such as a neural network, a support vector machine (SVM) method, a recognition method based on AdaBoost using a Haar-like feature, and/or a histograms of oriented gradients (HOG) method.

In some implementations, the object verification unit 436 may compare the detected object with objects stored in the first memory 140 to verify the detected object.

For example, the object verification unit 436 may verify various types of objects, such as an adjacent vehicle, a lane, a road surface, a traffic sign, a dangerous zone, a tunnel, etc. located around the vehicle.

The object tracking unit 440 tracks the verified object. For example, the object tracking unit 440 may verify an object in stereo images that have been sequentially acquired, calculate motion or a motion vector of the verified object, and track a movement of the object based on the calculated motion or the calculated motion vector. Consequently, the object tracking unit 440 may track various types of objects, such as an adjacent vehicle, a lane, a road surface, a traffic sign, a dangerous zone, a tunnel, etc., located around the vehicle.

Subsequently, the application unit 450 may perform processing to determine a risk to the vehicle 200 based on various objects, such as an adjacent vehicle, a lane, a road surface, and a traffic sign, that are located around the vehicle. In some implementations, the application unit 450 may further calculate a possibility of a rear-end collision with a preceding vehicle, slip of the vehicle, etc.

In addition, the application unit 450 may output a message informing a user of information regarding the determined risk to the vehicle. Such output information may be in the form of driver assistance information that is based on the calculated risk, the calculated possibility of the rear-end collision, and/or the calculated slip of the vehicle. Alternatively, the application unit 450 may create a control signal for attitude control or travel control of the vehicle 200 as vehicle control information.

FIG. 4B is an internal block diagram showing another example of a processor (e.g., the processor 170).

Referring to the example in FIG. 4B, the processor 170 is identical in construction to the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive stereo images and detect an object for at least one of the stereo images. Unlike FIG. 4A, instead of detecting an object for an image segmented based on disparity information, the object detector 434 in FIG. 4B may directly detect an object from a stereo image.

Subsequently, the object verification unit 436 classifies and verifies the detected and separated object based on the image segment from the segmentation unit 432 and the object detected by the object detector 434.

To this end, the object verification unit 436 may use a suitable recognition method, such as a neural network, an SVM method, a recognition method based on AdaBoost using a Haar-like feature, and/or a HOG method.

FIG. 4C is an internal block diagram showing a further example of the processor 170.

Referring to FIG. 4C, the processor 170 of FIG. 4C is different from the processor 170 of FIG. 4A in that the processor 170 of FIG. 4C further includes other units which are not included in the processor 170 of FIG. 4A. Hereinafter, a description will be given of only the difference between the processor 170 of FIG. 4C and the processor 170 of FIG. 4A.

The processor 170 of the driver assistance apparatus 100 may further include a depth map creation unit 460, a road profile unit 464, and a lane detection unit 468.

The depth map creation unit 460 may create a depth map based on preprocessed images. To this end, various methods, such as dynamic programming (DP), belief propagation (BP), and graph-cut, may be used.

The road profile unit 464 may profile a road surface based on the depth map. The road profile unit 464 may analyze a state of the road on a YZ plane based on the depth map. The road profile unit 464 may analyze a change of the road surface based on the depth map.

The lane detection unit 468 may detect a lane on the road based on the image segment from the segmentation unit 432 or the depth map. Lane detection may be executed using a well-known algorithm.

The application unit 450 may determine whether a road ahead of the vehicle is an uphill or a downhill.

For example, the application unit 450 may determine whether the road ahead of the vehicle is the uphill or the downhill based on a state or change of the road surface analyzed by the road profile unit 464. The application unit 450 may calculate X, Y, and Z axis reference data of the road from the depth map. In particular, the application unit 450 may calculate road surface data on the YZ plane. At this time, rise and fall of the road surface on the YZ plane may be detected. For example, in a case in which the road surface extends to a predetermined length or more while having a predetermined angle in a positive direction of the Y axis, the application unit 450 may determine that the road ahead of the vehicle is the uphill. On the other hand, in a case in which the road surface extends to a predetermined length or more while having a predetermined angle in a negative direction of the Y axis, the application unit 450 may determine that the road ahead of the vehicle is the downhill. In addition, the application unit 450 may determine a tilt of the uphill or the downhill of the road ahead of the vehicle based on the length of the road surface on the Z axis and the length of the road surface on the Y axis.

For example, the application unit 450 may determine whether the road ahead of the vehicle is the uphill or the downhill based on a change of the detected lane. In a case in which the lane is detected based on the image segment from the segmentation unit 432, the application unit 450 may analyze a change of the lane (e.g. whether the lane extends while having a predetermined angle in the positive direction of the Y axis or the lane extends while having a predetermined angle in the negative direction of the Y axis) to determine whether the road ahead of the vehicle is the uphill or the downhill. On the other hand, in a case in which the lane is detected based on the depth map, the application unit 450 may determine whether the road ahead of the vehicle is the uphill or the downhill through the same process as for the road surface.

In another example, the application unit 450 may determine whether the road ahead of the vehicle is the uphill or the downhill based on a plurality of fixed objects around the road indicated in the stereo images or the depth map. The fixed objects around the road may include streetlights, roadside tree, or electric poles. The application unit 450 may track positions, relative motions, or sizes of objects continuously arranged along the road to determine whether the road ahead of the vehicle is the uphill or the downhill.

In a further example, the application unit 450 may determine whether the road ahead of the vehicle is the uphill or the downhill based on a disappearance point indicated in the stereo images or the depth map. In a case in which the disappearance point in the stereo images is located above a reference line, the application unit 450 may determine that the road ahead of the vehicle is the uphill. On the other hand, in a case in which the disappearance point in the stereo images is located below the reference line, the application unit 450 may determine that the road ahead of the vehicle is the downhill.

FIGS. 5A and 5B are diagrams illustrating examples of an operation of a processor (e.g., the processor 170 shown in FIG. 4A) based on stereo images acquired from first and second frame periods.

Referring first to FIG. 5A, the stereo camera 195 acquires stereo images during the first frame period.

The disparity calculator 420 of the processor 170 receives stereo images FR1a and FR1b signal-processed by the image preprocessor 410 and performs stereo matching for the received stereo images FR1a and FR1b to acquire a disparity map 520.

The disparity map 520 shows a disparity between the stereo images FR1a and FR1b as different levels. When a disparity level of a region (e.g., an object) in the image is higher, the distance from the region to the vehicle may be calculated as being smaller. When a disparity level is lower, on the other hand, the distance to the vehicle may be calculated as being greater.

As an example, the disparity map may be displayed with higher brightness when the disparity level is higher, and the disparity map may be displayed with lower brightness when the disparity level is lower. In such cases, a distance to an object around the vehicle may be determined based on the brightness of the corresponding region in the disparity map of the image.

FIG. 5A shows, by way of example, that, in the disparity map 520, first to fourth lanes 528a, 528b, 528c, and 528d have their own disparity levels, and a construction zone 522, a first preceding vehicle 524, and a second preceding vehicle 526 have their own disparity levels.

The segmentation unit 432, the object detector 434, and the object verification unit 436 may respectively perform segmentation, object detection, and object verification for at least one of the stereo images FR1a and FR1b based on the disparity map 520.

FIG. 5A shows, by way of example, that object detection and verification for the second stereo image FR1b are performed using the disparity map 520.

For example, object detection and verification for first to fourth lanes 538a, 538b, 538c, and 538d, a construction zone 532, a first preceding vehicle 534, and a second preceding vehicle 536 in an image 530 may be performed.

In some implementations, the disparity levels may be used to determine distances to objects in the image. In the example of FIG. 5A, distances to the construction zone 532, the first preceding vehicle 534, and the second preceding vehicle 536 may be calculated to be 12.0 m, 13.5 m, and 55.8 m, respectively.

Referring now to FIG. 5B, the stereo camera 195 acquires stereo images during the second frame period.

The disparity calculator 420 of the processor 170 receives stereo images FR2a and FR2b signal-processed by the image preprocessor 410 and performs stereo matching for the received stereo images FR2a and FR2b to acquire a disparity map 540.

FIG. 5B shows, by way of example, that, in the disparity map 540, first to fourth lanes 548a, 548b, 548c, and 548d have their own disparity levels, and a construction zone 542, a first preceding vehicle 544, and a second preceding vehicle 546 have their own disparity levels.

The segmentation unit 432, the object detector 434, and the object verification unit 436 respectively perform seg-mentation, object detection, and object verification for at least one of the stereo images FR2a and FR2b based on the disparity map 540.

FIG. 5B shows, by way of example, that object detection and verification for the second stereo image FR2b are performed using the disparity map 540.

For example, object detection and verification for first to fourth lanes 558a, 558b, 558c, and 558d, a construction zone 552, a first preceding vehicle 554, and a second preceding vehicle 556 in an image 550 may be performed.

In some implementations, the disparity levels may be used to determine distances to objects in the image. In the example of FIG. 5B, a distance 553 to the construction zone 532, a distance 555 to the first preceding vehicle 534, and a distance 557 to the second preceding vehicle 536 may be calculated to be 12.0 m, 13.5 m, and 55.8 m, respectively.

The object tracking unit 440 may track the objects verified based on a comparison between FIGS. 5A and 5B.

Specifically, the object tracking unit 440 may track movement of the objects verified in FIGS. 5A and 5B based on motion or motion vectors of the objects. Consequently, in the example of FIGS. 5A and 5B, the object tracking unit 440 may track the lanes, the construction zone, the first preceding vehicle, and the second preceding vehicle located around the vehicle.

Figure 6A:
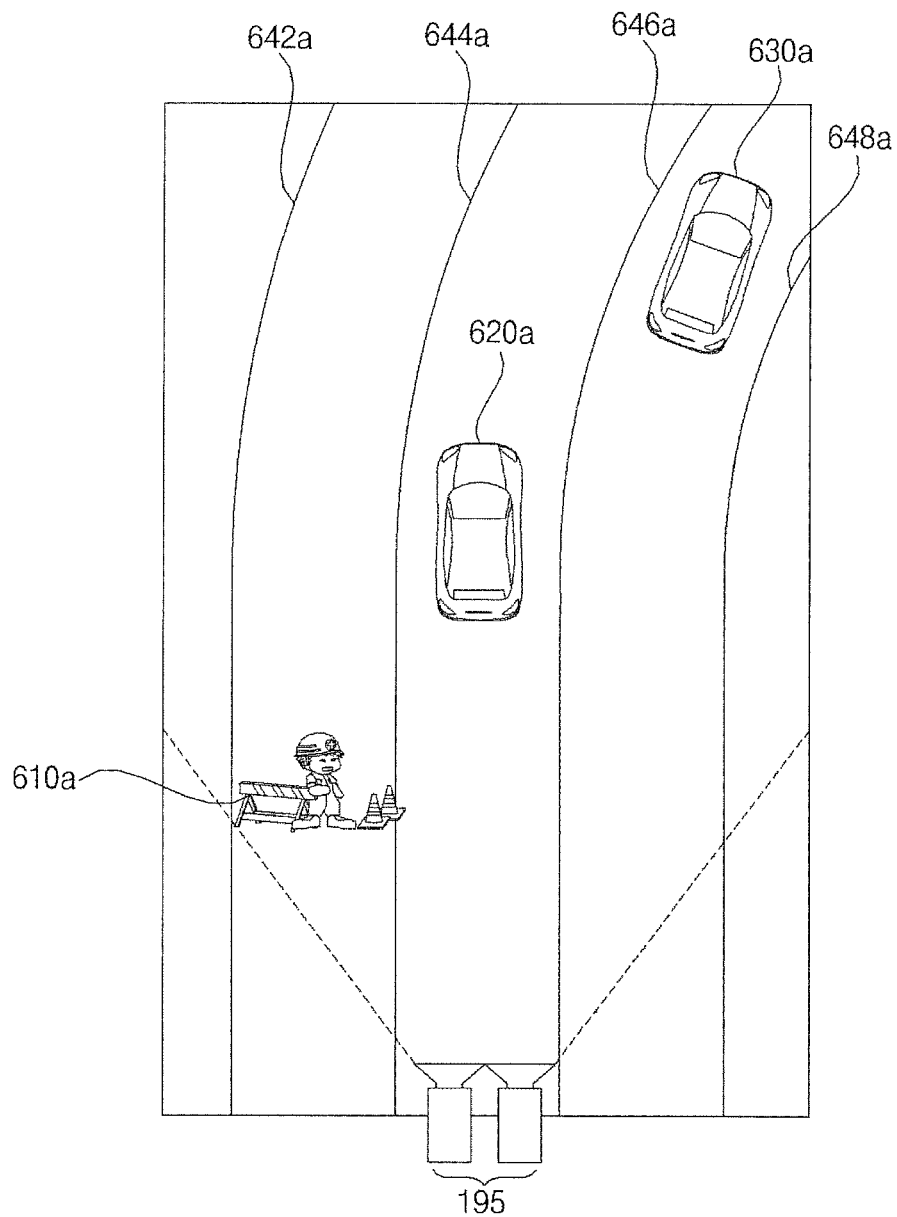
FIGS. 6A and 6B are diagrams illustrating examples of operations of a driver assistance apparatus.
Figure 6B:
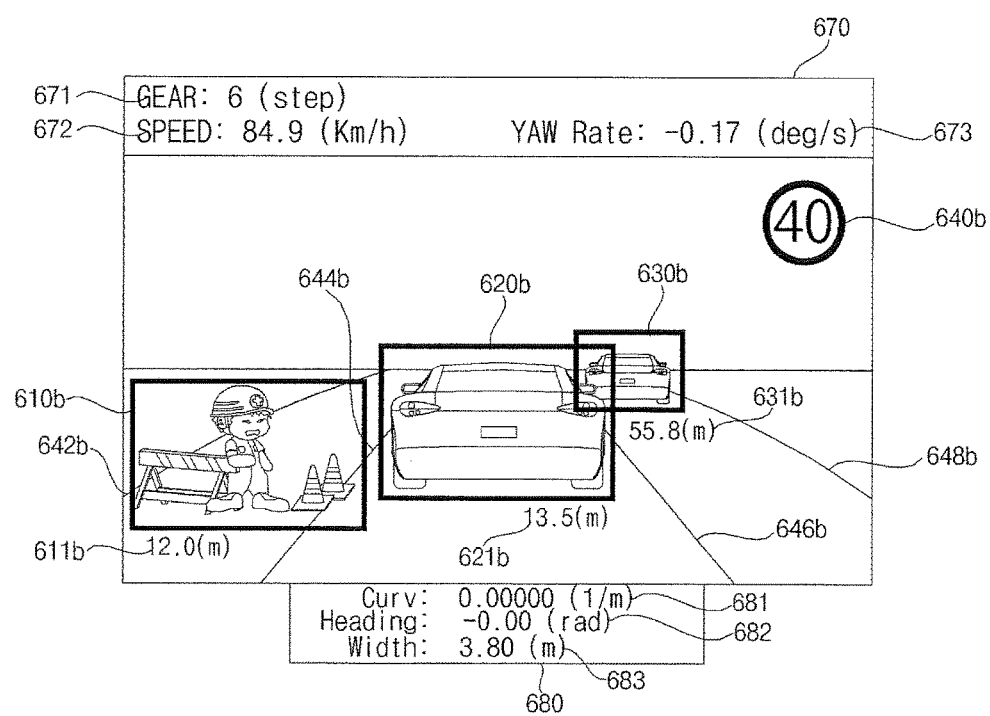

FIGS. 6A and 6B are reference views illustrating examples of an operation of a driver assistance apparatus (e.g., the driver assistance apparatus shown in FIG. 3).

FIG. 6A is a view showing, by way of example, a state ahead of the vehicle taken by the stereo camera 195 provided in the vehicle. In this example, the state ahead of the vehicle is displayed as a bird's eye view.

Referring to FIG. 6A, a first lane 642a, a second lane 644a, a third lane 646a, and a fourth lane 648a are arranged from the left side to the right side of the image. A construction zone 610a is located between the first lane 642a and the second lane 644a. A first preceding vehicle 620a is located between the second lane 644a and the third lane 646a. A second preceding vehicle 630a is located between the third lane 646a and the fourth lane 648a.

FIG. 6B is a view showing, by way of example, a state ahead of the vehicle acquired by the driver assistance apparatus together with various kinds of information. In particular, an image as shown in FIG. 6B may be displayed on the display unit 180 of the driver assistance apparatus or on the AVN apparatus 400.

FIG. 6B shows, by way of example, that information is displayed based on images taken by the stereo camera 195 unlike FIG. 6A.

Referring to FIG. 6B, a first lane 642b, a second lane 644b, a third lane 646b, and a fourth lane 648b are arranged from the left side to the right side of the image. A construction zone 610b is located between the first lane 642b and the second lane 644b. A first preceding vehicle 620b is located between the second lane 644b and the third lane 646b. A second preceding vehicle 630b is located between the third lane 646b and the fourth lane 648b.

The driver assistance apparatus 100 may perform signal processing based on stereo images taken by the stereo camera 195 to verify objects for the construction zone 610b, the first preceding vehicle 620b, and the second preceding vehicle 630b. In addition, the driver assistance apparatus 100 may verify the first lane 642b, the second lane 644b, the third lane 646b, and the fourth lane 648b.

FIG. 6B shows, by way of example, that, in order to indicate that the objects for the construction zone 610b, the first preceding vehicle 620b, and the second preceding vehicle 630b have been verified, borders of the objects are highlighted.

In some implementations, the driver assistance apparatus 100 may calculate distance information for the construction zone 610b, the first preceding vehicle 620b, and the second preceding vehicle 630b based on stereo images taken by the stereo camera 195.

FIG. 6B shows, by way of example, that calculated first distance information 611b, calculated second distance information 621b, and calculated third distance information 631b respectively corresponding to the construction zone 610b, the first preceding vehicle 620b, and the second preceding vehicle 630b are displayed.

The driver assistance apparatus 100 may receive sensor information for the vehicle from the control unit 770 and/or the sensor unit 760. In particular, the driver assistance apparatus 100 may receive and display vehicle speed information, gear information, yaw rate information indicating a speed at which a rotational angle (yaw angle) of the vehicle is changed, and/or vehicle angle information.

FIG. 6B shows, by way of example, that vehicle speed information 672, gear information 671, and yaw rate information 673 are displayed at a portion 670 above the image ahead of the vehicle, and vehicle angle information 682 is displayed at a portion 680 under the image ahead of the vehicle. However, other types of information may be displayed in the image, and implementations are not limited to the above examples. For example, in some cases, vehicle width information 683 and road curvature information 681 may be displayed together with the vehicle angle information 682.

In some implementations, the driver assistance apparatus 100 may receive speed limit information for a road on which the vehicle is traveling through the communication unit 120 or the interface unit 130. FIG. 6B shows, by way of example, that speed limit information 640b is displayed.

The driver assistance apparatus 100 may display various types of information shown in FIG. 6B through the display unit 180. Alternatively, the driver assistance apparatus 100 may store various types of information without additionally displaying the information. In addition, the driver assistance apparatus 100 may utilize the information in various applications.

Figure 7:
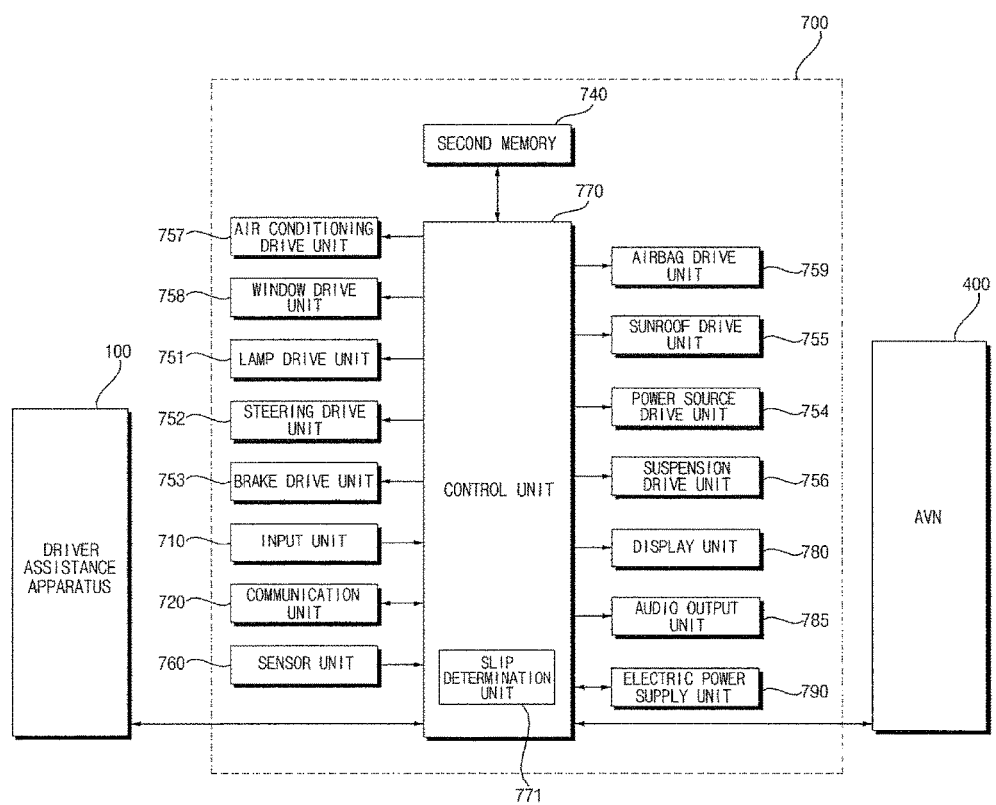
FIG. 7 is an internal block diagram illustrating an example of an electronic control apparatus in a vehicle.

FIG. 7 is an internal block diagram showing an example of an electronic control apparatus in a vehicle (e.g., the vehicle shown in FIG. 1).

Referring to FIG. 7, the vehicle 200 may include an electronic control apparatus 700 for vehicle control. The electronic control apparatus 700 may exchange data with the driver assistance apparatus 100 and the AVN apparatus 400.

The electronic control apparatus 700 may include an input unit 710, a communication unit 720, a second memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, a control unit 770, a display unit 780, an audio output unit 785, and an electric power supply unit 790.

The input unit 710 may include an appropriate user interface, such as a plurality of buttons or a touchscreen, provided in the vehicle 200. Various input operations may be executed through interface, e.g., the buttons or the touchscreen.

The communication unit 720 may exchange data with the mobile terminal 600 or the server 500, e.g., in a wireless fashion. As a particular example, the communication unit 720 may exchange data with a mobile terminal of the driver in a wireless fashion. To this end, various wireless data communication protocols, such as Bluetooth, Wi-Fi, Wi-Fi Direct, and/or APiX, may be used.

The communication unit 720 may receive various types of information, such as weather information and/or road traffic state information, such as TPEG information, from the mobile terminal 600 or the server 500.

When a user gets into the vehicle, a mobile terminal 600 of the user may pair with the electronic control apparatus 700 automatically or by the user executing an application.

The second memory 740 may store various data for overall operation of the electronic control apparatus 700, such as programs for processing or control of the control unit 770.

The lamp drive unit 751 may control turn on/turn off of lamps provided inside and outside the vehicle. In addition, the lamp drive unit 751 may control intensity, direction, etc. of light emitted from each lamp. For example, the lamp drive unit 751 may control a direction indicating lamp, a brake lamp, etc.

The steering drive unit 752 may electronically control a steering apparatus in the vehicle 200. Consequently, the steering drive unit 752 may change a heading of the vehicle.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200.

For example, in a case in which the power source is an engine using fossil fuel, the power source drive unit 754 may electronically control the engine. Consequently, the power source drive unit 754 may control output torque of the engine. In a case in which the power source is the engine, the power source drive unit 754 may restrict output torque of the engine to limit the vehicle speed under control of the control unit 770. The power source drive unit 754 may correspond to a power source drive device.

In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, and an in-vehicle humidity sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

In addition, the sensor unit 760 may further include an acceleration pedal sensor, a pressure sensor, an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The control unit 770 may control overall operation of each unit in the electronic control apparatus 700. The control unit 770 may be an electronic control unit (ECU).

The control unit 770 may execute a specific operation based on an input through the input unit 710, receive and transmit a signal sensed by the sensor unit 760 to the driver assistance apparatus 100, receive map information from the AVN apparatus 400, or control operations of the respective drive units 751, 752, 753, 754, and 756.

In addition, the control unit 770 may receive weather information and road traffic state information, such as TPEG information, from the communication unit 720.

The control unit 770 may receive information regarding an uphill or a downhill of a road ahead of the vehicle from the driver assistance apparatus 100. The control unit 770 may store the information regarding the uphill or the downhill of the road ahead of the vehicle and slip information created by a slip determination unit 771 in the second memory 740 in a state in which the information regarding the uphill or the downhill of the road ahead of the vehicle is matched with the slip information. In such cases, the control unit 770 may cumulatively store the matched information.

In some implementations, the control unit 770 may receive the information regarding the uphill or the downhill of the road ahead of the vehicle cumulatively stored in the first memory 140. The control unit 770 may apply a Kalman filter to the cumulatively stored information regarding the uphill or the downhill of the road ahead of the vehicle. In this case, the control unit 770 may estimate a vehicle slip degree based on the uphill or downhill information to which the Kalman filter has been applied. For example, the control unit 770 may estimate a vehicle slip degree corresponding to the uphill or downhill to which the Kalman filter has been applied based on the slip information stored while being matched with the uphill or downhill information. The control unit 770 may control the power source drive unit or the brake drive unit such that the brake can be driven at a level equivalent to a fraction (e.g., 90% or less) of the full brake based on the estimated slip degree.

In some implementations, the control unit 770 may apply the Kalman filter to the slip information cumulatively stored in the second memory 740 to estimate a slip degree of the vehicle. The control unit 770 may control the power source drive unit 754 or the brake drive unit 753 such that the brake can be driven at a level equivalent to 90% or less the full brake based on the estimated slip degree and the information regarding the uphill or the downhill of the road ahead of the vehicle.

The display unit 780 may display an image related to the operation of the driver assistance apparatus. In order to display such an image, the display unit 780 may include a cluster or an HUD provided at the inside front of the vehicle. In a case in which the display unit 180 is the HUD, the display unit 180 may include a projection module to project an image on the windshield of the vehicle 200. On the other hand, the display unit 780 may include a touchscreen to allow an input by tapping on the screen.

The audio output unit 785 converts an electric signal received from the control unit 770 into an audio signal and outputs the audio signal. To this end, the audio output unit 785 may include a speaker. The audio output unit 785 may output a sound corresponding to an operation of the input unit 710, e.g. a button.

The electric power supply unit 790 may supply electric power to the respective components under control of the control unit 770. For example, electric power from an in-vehicle battery may be supplied to the electric power supply unit 790.

In some implementations, the electronic control apparatus 700 of the vehicle 200 may further include a slip determination unit 771. The slip determination unit 771 may be included in the control unit 770 as a subcomponent. For example, the sensor unit 760 may include a wheel speed sensor. The wheel speed sensor may sense a wheel rotational speed corresponding to vehicle acceleration or deceleration. The wheel rotational speed sensed by the wheel speed sensor may be input to the control unit 770. The control unit 770 may compare a wheel rotational speed calculated by the power source with the wheel rotational speed sensed by the wheel speed sensor to determine whether the vehicle has slipped.

In another example, the slip determination unit 771 may determine whether the vehicle has slipped using odometry. The slip determination unit 771 may compare a distance by which the vehicle 200 is to be moved using power generated by the power source drive unit 754 with a distance by which the vehicle 200 has been actually moved to determine whether the vehicle has slipped. Specifically, in a case in which the distance by which the vehicle 200 has been actually moved is shorter than the distance by which the vehicle 200 is to be moved, the slip determination unit 771 may determine that the vehicle has slipped. In addition, the slip determination unit 771 may determine a slip degree of the vehicle in proportion to the distance difference. At this time, the distance by which the vehicle 200 has been actually moved may be calculated based on speed information and moving time.

The slip determination unit 771 may, in some implementations, cumulatively store the slip degree of the vehicle in the second memory 740.

Figure 8:
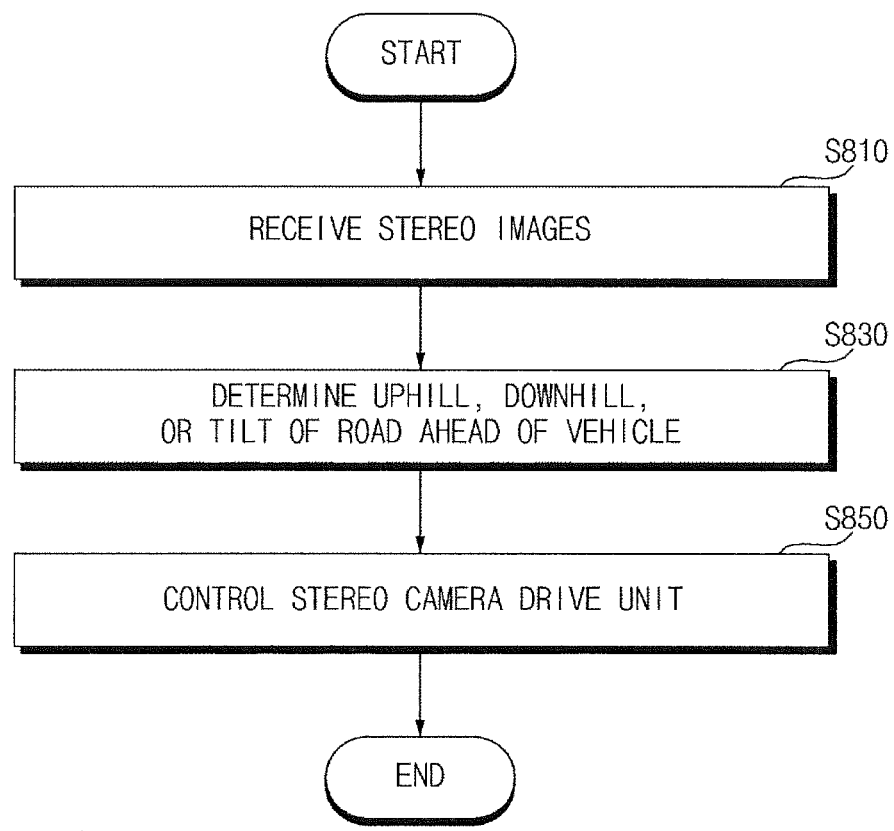
FIGS. 8, 9A, and 9B are flowcharts illustrating examples of an operation of a driver assistance apparatus.
Figure 9A:
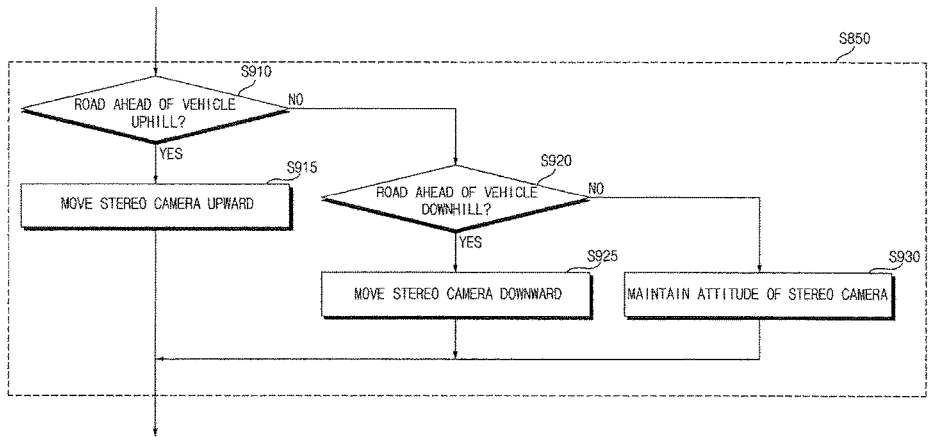
Figure 9B:
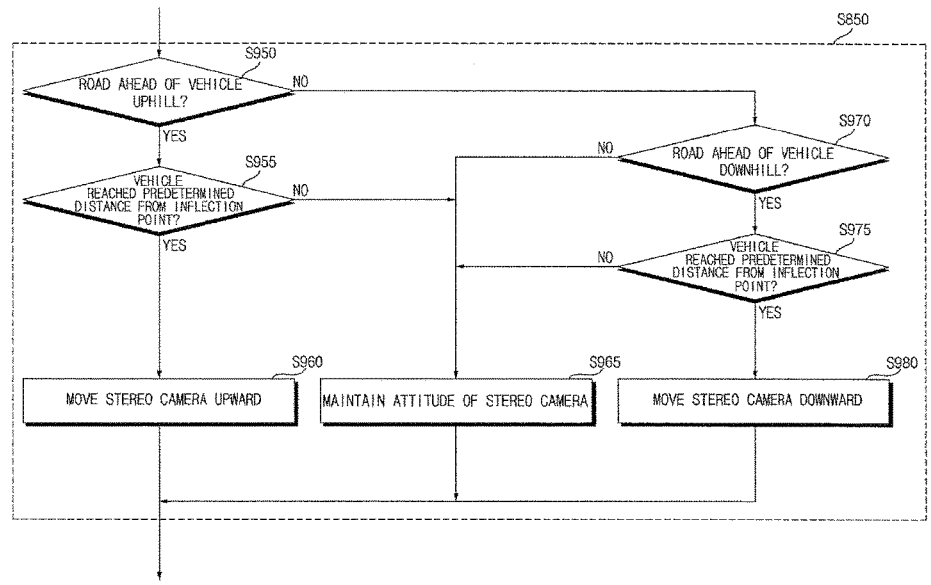

FIGS. 8 to 9B are flowcharts illustrating examples of an operation of a driver assistance apparatus.

Referring to FIG. 8, the processor 170 receives stereo images from the stereo camera 195 (which corresponds to a stereo image acquisition step) (S810).

In a state in which the processor 170 receives the stereo images, the processor 170 determines an uphill of the road ahead of the vehicle, a downhill of the road ahead of the vehicle, or a tilt of the road ahead of the vehicle based on the stereo images (S830).

For example, the processor 170 may create a depth map based on preprocessed stereo images. The processor 170 may profile a road surface based on the depth map. The processor 170 may determine whether the road ahead of the vehicle is the uphill or the downhill based on profiling of the road surface. For example, the profiled road surface may provide rise and fall of the road surface on the YZ plane. In a case in which the road surface extends to a predetermined length or more while having a predetermined angle in a positive direction of the Y axis, the processor 170 may determine that the road ahead of the vehicle is the uphill. On the other hand, in a case in which the road surface extends to a predetermined length or more while having a predetermined angle in a negative direction of the Y axis, the processor 170 may determine that the road ahead of the vehicle is the downhill. In addition, the processor 170 may determine a tilt of the uphill or the downhill based on the profiled road surface. For example, the processor 170 may determine the tilt of the uphill or the downhill based on the length of the road surface on the Z axis and the length of the road surface on the Y axis. In this case, the processor 170 may function as an uphill tilt determination device or a downhill tilt determination device.

For example, the processor 170 may detect a lane from the stereo images. The processor 170 may determine whether the road ahead of the vehicle is the uphill or the downhill based on the detected lane. In a case in which the lane extends to a predetermined length or more while having a predetermined angle in the positive direction of the Y axis, the processor 170 may determine that the road ahead of the vehicle is the uphill. On the other hand, in a case in which the lane extends to a predetermined length or more while having a predetermined angle in the negative direction of the Y axis, the processor 170 may determine that the road ahead of the vehicle is the downhill. In addition, the processor 170 may determine a tilt of the uphill or the downhill based on the lane. For example, the processor 170 may determine the tilt of the uphill or the downhill based on the length of the lane on the Z axis and the length of the lane on the Y axis.

In another example, the processor 170 may detect a plurality of fixed objects around the road from the stereo images. The objects may include streetlights, roadside tree, or electric poles. The processor 170 may track positions, relative motions, or sizes of objects continuously arranged along the road to determine whether the road ahead of the vehicle is the uphill or the downhill. For example, in a case in which streetlights having the same size are arranged along one side of the road, the processor 170 may calculate the distances to the streetlights through disparity calculation. The distances to first and second streetlights on the Z axis may be compared with the distances to the first and second streetlights on the Y axis to determine whether the road ahead of the vehicle is the uphill or the downhill. In addition, the processor 170 may determine a tilt of the uphill or the downhill based on the objects. For example, the processor 170 may determine the tilt of the uphill or the downhill based on the distances to the first and second streetlights on the Z axis and the distances to the first and second streetlights on the Y axis.

In a further example, the processor 170 may determine whether the road ahead of the vehicle is the uphill or the downhill based on a disappearance point indicated in the stereo images. In a case in which the disappearance point in the stereo images is located above a reference line, the processor 170 may determine that the road ahead of the vehicle is the uphill. On the other hand, in a case in which the disappearance point in the stereo images is located below the reference line, the processor 170 may determine that the road ahead of the vehicle is the downhill.

In a state in which it is determined whether the road ahead of the vehicle is the uphill or the downhill, the processor 170 controls the stereo camera drive unit 196 based on determination as to whether the road ahead of the vehicle is the uphill or the downhill.

FIGS. 9A and 9B are flowcharts illustrating further details of step S850 of FIG. 8.

Referring to the example in FIG. 9A, in a case in which it is determined that the road ahead of the vehicle is the uphill (S910), the processor 170 outputs a control signal to the stereo camera drive unit 196 to control the stereo camera drive unit 196 such that the stereo camera 195 is moved upward (S915). In this case, the processor 170 may function as a control signal output device. The processor 170 controls the stereo camera 195 to be moved upward in proportion to a tilt of the uphill. For example, the processor 170 may control the stereo camera 195 to be moved upward in response to the tilt of the uphill. As a result, the stereo camera 195 may be moved upward before the vehicle 200 enters the uphill, whereby it is possible to adaptively acquire images for a view ahead of the vehicle 200.

On the other hand, in a case in which it is determined that the road ahead of the vehicle is not the uphill but is the downhill (S910 and S920), the processor 170 outputs a control signal to the stereo camera drive unit 196 to control the stereo camera drive unit 196 such that the stereo camera 195 is moved downward (S925). The processor 170 controls the stereo camera 195 to be moved downward in response to a tilt of the downhill. For example, the processor 170 may control the stereo camera 195 to be moved downward in response to the tilt of the downhill. As a result, the stereo camera 195 may be moved downward before the vehicle 200 enters the downhill, whereby it is possible to adaptively acquire images for a view ahead of the vehicle 200.

In a case in which it is determined that the road ahead of the vehicle is neither the uphill nor the downhill (S910 and S920), the processor 170 maintains the attitude of the stereo camera 195 (S930).

Referring to the example in FIG. 9B, in a case in which it is determined that the road ahead of the vehicle is the uphill (S950), the processor 170 determines whether the vehicle has reached a predetermined distance from an inflection point (S955). The inflection point may be a start point of the uphill. The processor 170 may set an inflection point based on the depth map and determine whether the vehicle 200 has reached a predetermined distance from the inflection point based on information regarding the distance to the inflection point.

In a case in which the vehicle 200 has reached the predetermined distance from the inflection point, the processor 170 outputs a control signal to the stereo camera drive unit 196 to control the stereo camera drive unit 196 such that the stereo camera 195 is moved upward (S960). The processor 170 controls the stereo camera 195 to be moved upward in response to a tilt of the uphill. The stereo camera 195 may be moved upward before the vehicle 200 enters the uphill, whereby it is possible to adaptively acquire images for a view ahead of the vehicle 200.

On the other hand, in a case in which it is determined that the road ahead of the vehicle is not the uphill but is the downhill (S950 and S970), the processor 170 determines whether the vehicle has reached a predetermined distance from an inflection point (S975). The inflection point may be a start point of the downhill. The processor 170 may set an inflection point based on the depth map and determine whether the vehicle 200 has reached a predetermined distance from the inflection point based on information regarding the distance to the inflection point.

In a case in which the vehicle 200 has reached the predetermined distance from the inflection point, the processor 170 outputs a control signal to the stereo camera drive unit 196 to control the stereo camera drive unit 196 such that the stereo camera 195 is moved downward (S980). The processor 170 controls the stereo camera 195 to be moved downward in response to a tilt of the downhill. The stereo camera 195 may be moved downward before the vehicle 200 enters the downhill, whereby it is possible to adaptively acquire images for a view ahead of the vehicle 200.

In a case in which it is determined that the road ahead of the vehicle is neither the uphill nor the downhill (S950 and S970), the processor 170 maintains the attitude of the stereo camera 195 (S965). In some implementations, in a case in which the road ahead of the vehicle is the uphill but the vehicle 200 has not reached the predetermined distance from the inflection point (S950 and S955), the processor 170 maintains the attitude of the stereo camera 195 (S965). On the other hand, in a case in which the road ahead of the vehicle is the downhill but the vehicle 200 has not reached the predetermined distance from the inflection point (S970 and S975), the processor 170 maintains the attitude of the stereo camera 195 (S965).

FIGS. 10A to 11B are diagrams illustrating examples of an operation of a processor (e.g., the processor 170 of FIG. 4C) of a driver assistance apparatus.

Figure 10A:
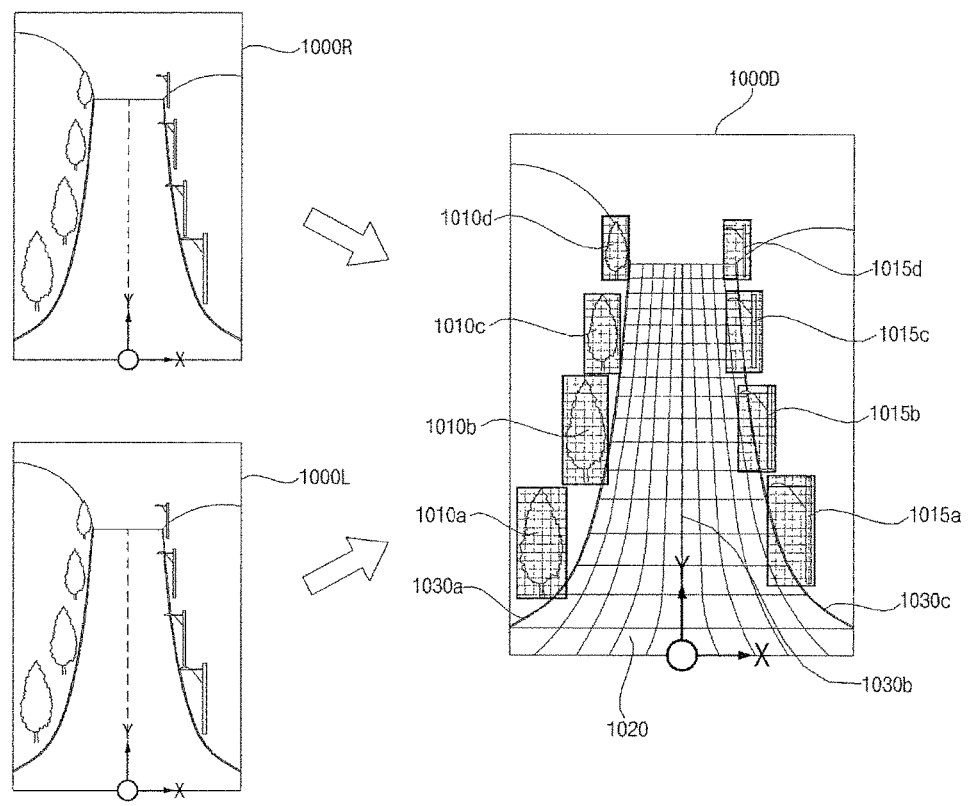
FIGS. 10A, 10B, 11A, and 11B are diagrams illustrating examples of a determination of an uphill road and a downhill road.
Figure 10B:
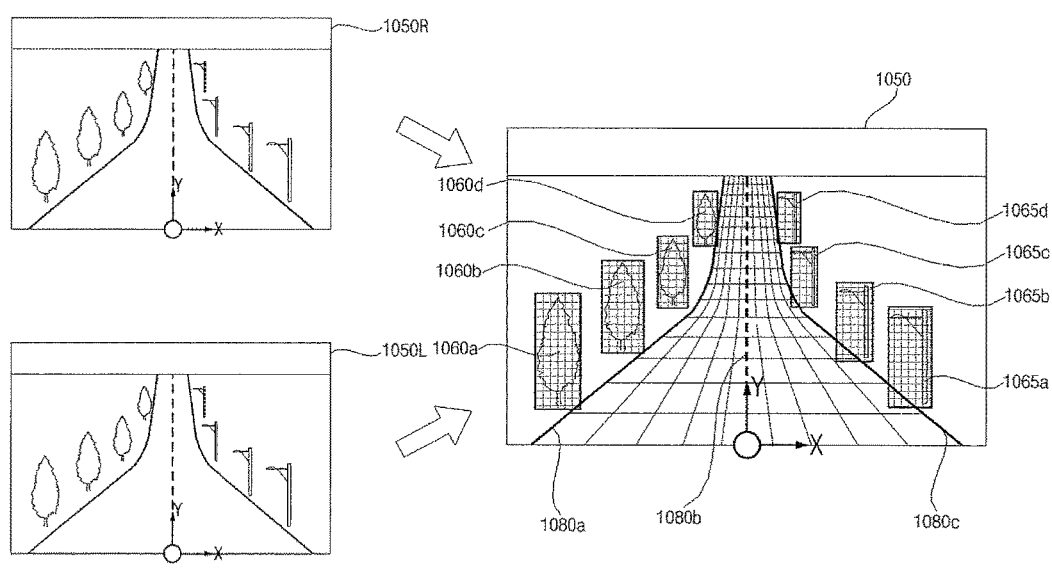
Figure 11A:
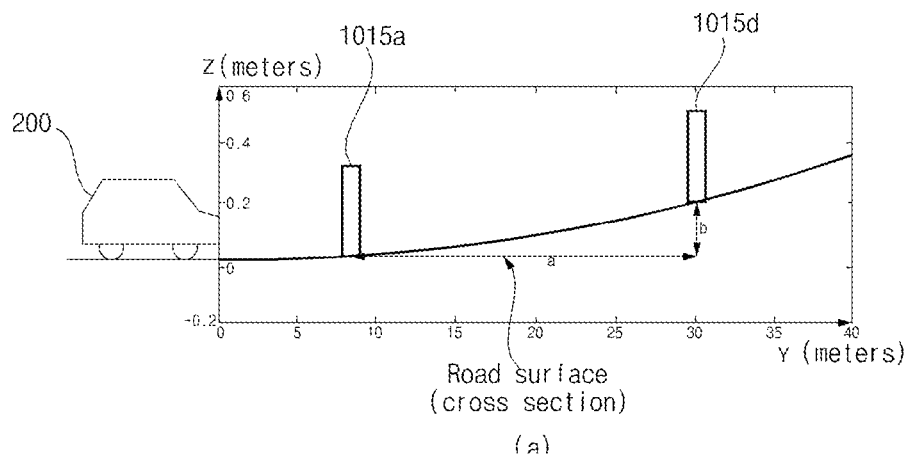
Figure 11B:
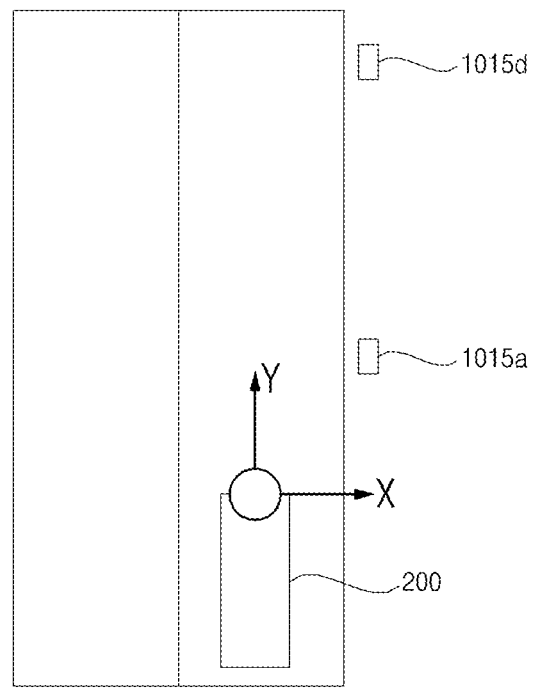

FIGS. 10A and 10B are diagrams showing examples of images for a view ahead of the vehicle 200 that can be acquired by the stereo camera 195. FIGS. 11A and 11B are views showing the images for the view ahead of the vehicle shown in FIG. 10A on a YZ plane and an XZ plane.

FIGS. 10A and 10B are based on an XY plane. FIG. 10A shows an uphill of the road ahead of the vehicle, and FIG. 10B shows a downhill of the road ahead of the vehicle.

Referring first to FIGS. 10A, 11A and 11B, the stereo camera 195 acquires stereo images 1000R and 1000L, and the processor 170 receives the stereo images 1000R and 1000L.

The processor 170 matches the stereo images 1000R and 1000L using global matching or local matching to create a depth map 1000D.

The depth map 1000D may include a plurality of roadside trees 1010a, 1010b, 1010c, and 1010d, a plurality of streetlights 1015a, 1015b, 1015c, and 1015d, a road surface 1020, and lanes 1030a, 1030b, and 1030c.

The processor 170 may detect the road surface 1020 from the depth map and determine whether the road ahead of the vehicle is the uphill based on the detected road surface. The processor 170 may calculate X, Y, and Z axis reference data of the road from the depth map. In particular, the processor 170 may calculate data of the road surface 1020 on the YZ plane. A rise and fall of the road surface 1020 on the YZ plane may be detected. In a case in which the road surface extends to a predetermined length or more while having a predetermined angle in a positive direction of the Y axis, the processor 170 may determine that the road ahead of the vehicle is the uphill. In some implementations, the processor 170 may determine a tilt of the uphill of the road ahead of the vehicle based on profiling of the road surface. For example, the processor 170 may determine the tilt of the uphill of the road ahead of the vehicle based on a length (a) of a portion of the road surface on the Z axis and a length (b) of the portion of the road surface on the Y axis.

The processor 170 may detect the lanes 1030a, 1030b, and 1030c based on the stereo images 1000R and 1000L or the depth map 1000D. In a case in which the detected lanes 1030a, 1030b, and 1030c extend to a predetermined length or more while having a predetermined angle in the positive direction of the Y axis, the processor 170 may determine that the road ahead of the vehicle is the uphill. In some implementations, the processor 170 may determine a tilt of the uphill of the road ahead of the vehicle based on the lanes. For example, the processor 170 may determine the tilt of the uphill of the road ahead of the vehicle based on a length (a) of a portion of each lane on the Z axis and a length (b) of the portion of each lane on the Y axis.

The processor 170 may determine whether the road ahead of the vehicle is the uphill based on a plurality of fixed objects 1010a, 1010b, 1010c, 1010d, 1015a, 1015b, 1015c, and 1015d around the road indicated in the stereo images 1000R and 1000L or the depth map 1000D. For example, in a case in which streetlights 1015a, 1015b, 1015c, and 1015d having the same size are arranged along one side of the road, the processor 170 may calculate the distances to the streetlights 1015a, 1015b, 1015c, and 1015d through disparity calculation. At this time, the distances to first and second streetlights 1015a and 1015d on the Z axis may be compared with the distances to the first and second streetlights 1015a and 1015d on the Y axis to determine whether the road ahead of the vehicle is the uphill. As a specific example, in a case in which the distance between the second streetlight 1015d and the vehicle 200 on the Z axis is greater than that between the first streetlight 1015a and the vehicle 200 on the Z axis, and the distance between the second streetlight 1015d and the vehicle 200 on the Y axis is greater than that between the first streetlight 1015a and the vehicle 200 on the Y axis, the processor 170 may determine that the road ahead of the vehicle is the uphill. On the other hand, the processor 170 may determine a tilt of the uphill of the road ahead of the vehicle based on the objects. For example, the processor 170 may determine the tilt of the uphill of the road ahead of the vehicle based on distances (a) to the first and second streetlights on the Z axis and distances (b) to the first and second streetlights on the Y axis.

Although not shown, in a case in which a disappearance point in the stereo images is located above a reference line, the processor 170 may determine that the road ahead of the vehicle is the uphill.

Referring now to the example in FIG. 10B, the stereo camera 195 acquires stereo images 1050R and 1050L, and the processor 170 receives the stereo images 1050R and 1050L.

The processor 170 matches the stereo images 1050R and 1050L using global matching or local matching to create a depth map 1050D.

The depth map 1050D may include a plurality of roadside trees 1060a, 1060b, 1060c, and 1060d, a plurality of streetlights 1065a, 1065b, 1065c, and 1065d, a road surface 1070, and lanes 1080a, 1080b, and 1080c.

The processor 170 may detect the road surface 1070 from the depth map and determine whether the road ahead of the vehicle is the downhill based on the detected road surface. The processor 170 may calculate X, Y, and Z axis reference data of the road from the depth map. In particular, the processor 170 may calculate data of the road surface 1080 on the YZ plane. A rise and fall of the road surface 1080 on the YZ plane may be detected. In a case in which the road surface extends to a predetermined length or more while having a predetermined angle in a negative direction of the Y axis, the processor 170 may determine that the road ahead of the vehicle is the downhill. In some implementations, the processor 170 may determine a tilt of the downhill of the road ahead of the vehicle based on profiling of the road surface. For example, the processor 170 may determine the tilt of the downhill of the road ahead of the vehicle based on the length of the road surface on the Z axis and the length of the road surface on the Y axis.

The processor 170 may detect the lanes 1080*a*, 1080*b*, and 1080*c* based on the stereo images 1050R and 1050L or the depth map 1050D. In a case in which the detected lanes 1080*a*, 1080*b*, and 1080*c* extend to a predetermined length or more while having a predetermined angle in the negative direction of the Y axis, the processor 170 may determine that the road ahead of the vehicle is the downhill. In some implementations, the processor 170 may determine a tilt of the downhill of the road ahead of the vehicle based on the lanes. For example, the processor 170 may determine the tilt of the downhill of the road ahead of the vehicle based on the length of each lane on the Z axis and the length of each lane on the Y axis.

The processor 170 may determine whether the road ahead of the vehicle is the downhill based on a plurality of fixed objects 1060*a*, 1060*b*, 1060*c*, 1060*d*, 1065*a*, 1065*b*, 1065*c*, and 1065*d* around the road indicated in the stereo images 1050R and 1050L or the depth map 1050D. For example, in a case in which streetlights 1065*a*, 1065*b*, 1065*c*, and 1065*d* having the same size are arranged along one side of the road, the processor 170 may calculate the distances to the streetlights 1065*a*, 1065*b*, 1065*c*, and 1065*d* through disparity calculation. The distances to first and second streetlights 1065*a* and 1065*d* on the Z axis may be compared with the distances to the first and second streetlights 1065*a* and 1065*d* on the Y axis to determine whether the road ahead of the vehicle is the downhill.

For example, in a case in which the distance between the second streetlight 1065*d* and the vehicle 200 on the Z axis is lesser than that between the first streetlight 1065*a* and the vehicle 200 on the Z axis, and the distance between the second streetlight 1065*d* and the vehicle 200 on the Y axis is greater than that between the first streetlight 1065*a* and the vehicle 200 on the Y axis, the processor 170 may determine that the road ahead of the vehicle is the downhill. In some implementations, the processor 170 may determine a tilt of the downhill of the road ahead of the vehicle based on the objects. For example, the processor 170 may determine the tilt of the downhill of the road ahead of the vehicle based on the distances to the first and second streetlights on the Z axis and the distances to the first and second streetlights on the Y axis.

Although not shown, in a case in which a disappearance point in the stereo images is located below a reference line, the processor 170 may determine that the road ahead of the vehicle is the downhill.

FIGS. 12A to 15B are diagrams illustrating examples of a motion of a stereo camera corresponding to an uphill and a downhill road.

Figure 12A:
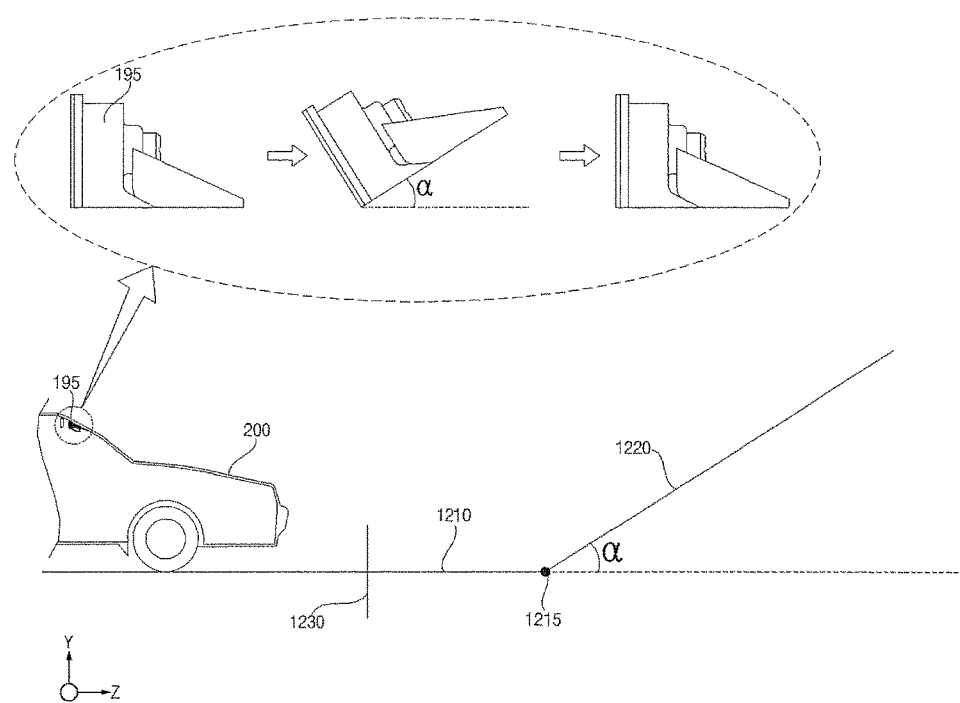
FIGS. 12A, 12B, 13A, 13B, 14A, 14B, 15A, and 15B are diagrams illustrating examples of a motion of a stereo camera corresponding to an uphill road and a downhill road.
Figure 12B:
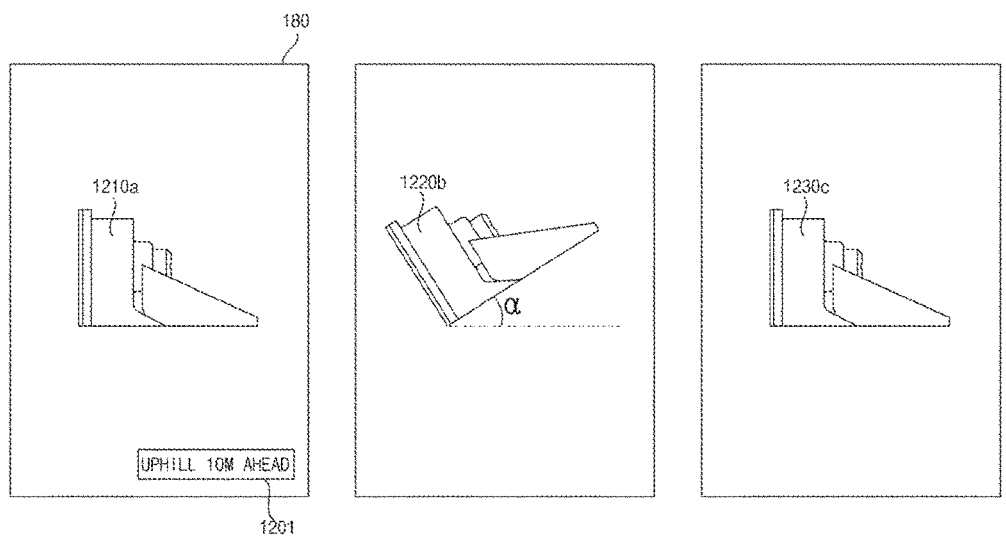

FIGS. 12A and 12B are diagrams illustrating examples of motions of the stereo camera 195 and the display unit 180 when the vehicle enters an uphill from a level ground in accordance with one embodiment of the present invention.

Referring to the example in FIG. 12A, when the vehicle 200 travels on a level ground 1210 in a positive direction of the Z axis, the processor 170 may determine that a road ahead of the vehicle is an uphill 1220. The processor 170 may output a control signal to the stereo camera drive unit 196 to control the stereo camera drive unit 196 such that the stereo camera 195 is moved upward. In this case, the processor 170 may control the stereo camera 195 to be moved upward in response to a tilt α of the uphill. For example, the processor 170 may control the stereo camera 195 to be moved upward in proportion to the tilt α of the uphill. Specifically, the processor 170 may control the stereo camera 195 to be tilted upward in proportion to the tilt α of the uphill. The processor 170 may control the stereo camera drive unit 196 to control the motion of the stereo camera 195.

In some implementations, the processor 170 may control the stereo camera 195 to be moved upward in response to a traveling speed of the vehicle 200. For example, the processor 170 may control an upward speed of the stereo camera 195 in proportion to the traveling speed of the vehicle 200.

In some implementations, when the vehicle 200 travels on the level ground 1210 in the positive direction of the Z axis, the processor 170 may determine that the road ahead of the vehicle is the uphill 1220. In a case in which it is determined that the road ahead of the vehicle is the uphill, the processor 170 determines whether the vehicle has reached a predetermined distance 1230 from an inflection point 1215. The inflection point 1215 may be a start point of the uphill. The processor 170 may set the inflection point 1215 based on the depth map and determine whether the vehicle 200 has reached the predetermined distance 1230 from the inflection point 1215 based on information regarding the distance to the inflection point 1215. The predetermined distance 1230 from the inflection point 1215 may be preset as a point at which the stereo camera 195 can be properly moved.

In a case in which the vehicle 200 has reached the predetermined distance 1230 from the inflection point 1215, the processor 170 may output a control signal to the stereo camera drive unit 196 to control the stereo camera drive unit 196 such that the stereo camera 195 is moved upward. The processor 170 may control the stereo camera 195 to be moved upward in response to the tilt α of the uphill. For example, the processor 170 may control the stereo camera 195 to be moved upward in proportion to the tilt α of the uphill. Specifically, the processor 170 may control the stereo camera 195 to be tilted upward in proportion to the tilt α of the uphill. The processor 170 may control the stereo camera drive unit 196 to control the motion of the stereo camera 195.

After the vehicle 200 has entered the uphill 1220, the processor 170 may output a control signal to the stereo camera drive unit 196 to control the stereo camera drive unit 196 such that the stereo camera 195 is moved downward. For example, after the vehicle 200 has entered the uphill 1220, the processor 170 may return the stereo camera 195 to the original position thereof. In this case, the processor 170 may return the stereo camera 195 to the original position thereof in response to the traveling speed of the vehicle 200. For example, the processor 170 may return the stereo camera 195 to the original position thereof in proportion to the traveling speed of the vehicle 200. Specifically, the processor 170 may tilt the stereo camera 195 downward to return the stereo camera 195 to the original position thereof in proportion to the traveling speed of the vehicle 200.

Referring to the example in FIG. 12B, when the vehicle 200 travels on the level ground 1210 in the positive direction of the Z axis, the stereo camera 195 assumes an attitude suitable for acquiring images for a view ahead of the vehicle 200. As shown in the example of the left-most part of FIG. 12B, the processor 170 graphically processes an image 1210a corresponding to the stereo camera 195 which assumes an attitude suitable for acquiring images for a view ahead of the vehicle 200 and displays the graphically-processed image through the display unit 180. In addition, the processor 170 may display information 1201 indicating that there is an uphill predetermined meters ahead of the vehicle on a portion of the display unit 180.

When the vehicle 200 enters the uphill 1220 from the level ground 1210, the processor 170 may output a control signal to the stereo camera drive unit 196 to control the stereo camera drive unit 196 such that the stereo camera 195 is moved upward immediately before the vehicle 200 enters the uphill 1220. As shown in the example of the middle part of FIG. 12B, the processor 170 graphically processes an image 1220b corresponding to the stereo camera 195 which is moved upward and displays the graphically-processed image through the display unit 180.

After the vehicle 200 has entered the uphill 1220, the processor 170 may output a control signal to the stereo camera drive unit 196 to control the stereo camera drive unit 196 such that the stereo camera 195 returns to the original position thereof. As shown in the right-most part of FIG. 12B, the processor 170 graphically processes an image 1230c corresponding to the stereo camera 195 which returns to the original position thereof and displays the graphically-processed image through the display unit 180.

In some implementations, the images 1210a, 1220b, and 1230c corresponding to the stereo camera 195 shown in FIG. 12B may be three-dimensionally displayed or displayed as a video. This may enable the driver of the vehicle 200 to intuitively recognize a current state of the stereo camera 195 through the images 1210a, 1220b, and 1230c displayed on the display unit 180.

Figure 13A:
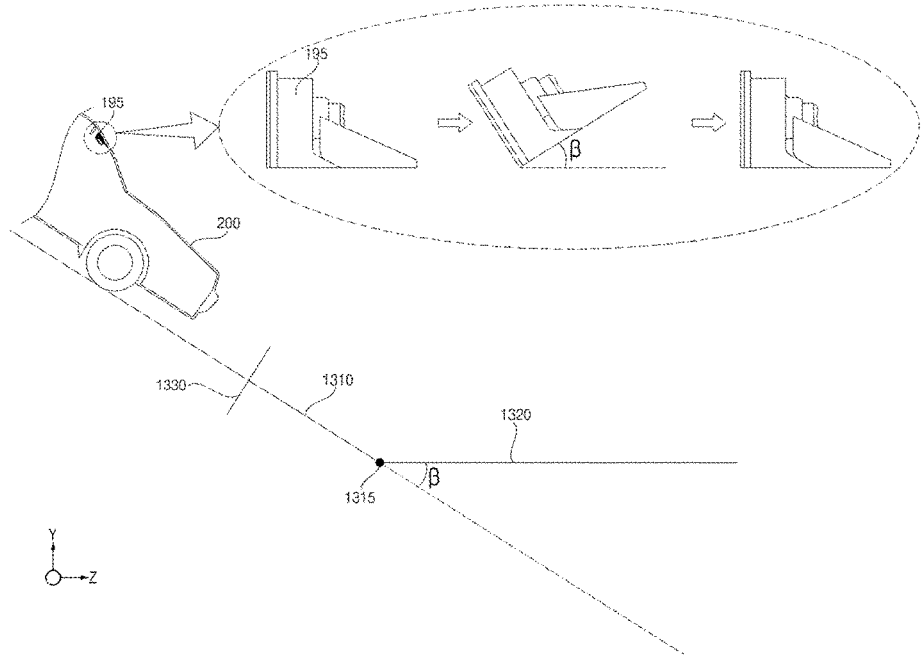
Figure 13B:
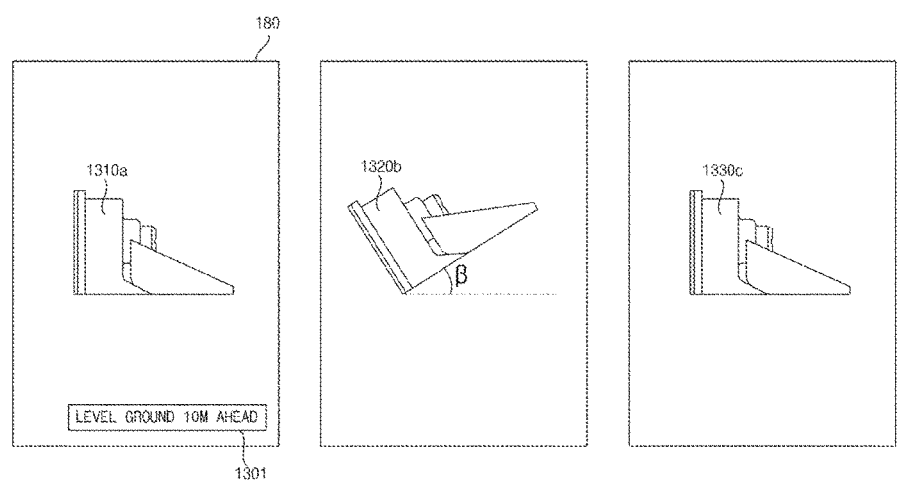

FIGS. 13A and 13B are diagrams illustrating the motions of the stereo camera 195 and the display unit 180 when the vehicle enters a level ground from a downhill road.

Referring to FIG. 13A, when the vehicle 200 travels on a downhill 1310 in a positive direction of the Z axis and in a negative direction of the Y axis, the processor 170 may determine that a road ahead of the vehicle is a level ground 1320. The processor 170 may determine the level ground 1320 based on determination as to whether the road ahead of the vehicle is the uphill or the downhill as described above. In this case, the processor 170 may output a control signal to the stereo camera drive unit 196 to control the stereo camera drive unit 196 such that the stereo camera 195 is moved upward. For example, the processor 170 may control the stereo camera 195 to be moved upward in response to a tilt β of the downhill. As a specific example, the processor 170 may control the stereo camera 195 to be moved upward in proportion to the tilt β of the downhill. The processor 170 may control the stereo camera 195 to be tilted upward in proportion to the tilt β of the downhill. The processor 170 may control the stereo camera drive unit 196 to control the motion of the stereo camera 195.

In some implementations, when the vehicle 200 travels on the downhill 1310 in the positive direction of the Z axis and in the negative direction of the Y axis, the processor 170 may determine that the road ahead of the vehicle is the level ground 1320. The processor 170 may determine the level ground 1320 based on determination as to whether the road ahead of the vehicle is the uphill or the downhill as described above. In a case in which it is determined that the road ahead of the vehicle is the level ground, the processor 170 determines whether the vehicle has reached a predetermined distance 1330 from an inflection point 1315. The inflection point 1315 may be a start point of the level ground. The processor 170 may set the inflection point 1315 based on the depth map and determine whether the vehicle 200 has reached the predetermined distance 1330 from the inflection point 1315 based on information regarding the distance to the inflection point 1315. In some implementations, the predetermined distance 1330 from the inflection point 1315 may be preset as a point at which the stereo camera 195 can be properly moved.

In a case in which the vehicle 200 has reached the predetermined distance 1330 from the inflection point 1315, the processor 170 may output a control signal to the stereo camera drive unit 196 to control the stereo camera drive unit 196 such that the stereo camera 195 is moved upward. In this case, the processor 170 may control the stereo camera 195 to be moved upward in response to the tilt β of the downhill. For example, the processor 170 may control the stereo camera 195 to be moved upward in proportion to the tilt β of the downhill. Specifically, the processor 170 may control the stereo camera 195 to be tilted upward in proportion to the tilt β of the downhill. In some implementations, the processor 170 may control the stereo camera drive unit 196 to control the motion of the stereo camera 195.

After the vehicle 200 has entered the level ground 1320, the processor 170 may output a control signal to the stereo camera drive unit 196 to control the stereo camera drive unit 196 such that the stereo camera 195 is moved downward. For example, after the vehicle 200 has entered the level ground 1320, the processor 170 may return the stereo camera 195 to the original position thereof. In this case, the processor 170 may return the stereo camera 195 to the original position thereof in response to the traveling speed of the vehicle 200. For example, the processor 170 may return the stereo camera 195 to the original position thereof in proportion to the traveling speed of the vehicle 200. Specifically, the processor 170 may tilt the stereo camera 195 downward to return the stereo camera 195 to the original position thereof in proportion to the traveling speed of the vehicle 200.

Referring to the example in FIG. 13B, when the vehicle 200 travels on the downhill 1310 in the positive direction of the Z axis and in the negative direction of the Y axis, the stereo camera 195 assumes an attitude suitable for acquiring images for a view ahead of the vehicle 200. In this case, as shown in the example of the left-most part of FIG. 13B, the processor 170 graphically processes an image 1310a corresponding to the stereo camera 195 which assumes an attitude suitable for acquiring images for a view ahead of the vehicle 200 and displays the graphically-processed image through the display unit 180. In addition, the processor 170 may display information 1301 indicating that there is a level ground predetermined meters ahead of the vehicle on a portion of the display unit 180.

When the vehicle 200 enters the level ground 1320 from the downhill 1310, the processor 170 may output a control signal to the stereo camera drive unit 196 to control the stereo camera drive unit 196 such that the stereo camera 195 is moved upward (e.g., immediately) before the vehicle 200 enters the level ground 1320. In this case, as shown in the example of the middle part of FIG. 13B, the processor 170 graphically processes an image 1320b corresponding to the stereo camera 195 which is moved upward and displays the graphically-processed image through the display unit 180.

After the vehicle 200 has entered the level ground 1320, the processor 170 may output a control signal to the stereo camera drive unit 196 to control the stereo camera drive unit

196 such that the stereo camera 195 returns to the original position thereof. For example, as shown in the right-most part of FIG. 13B, the processor 170 graphically processes an image 1330c corresponding to the stereo camera 195 which returns to the original position thereof and displays the graphically-processed image through the display unit 180.

In some implementations, the images 1310a, 1320b, and 1330c corresponding to the stereo camera 195 shown in FIG. 13B may be three-dimensionally displayed or displayed as a video.

Consequently, this may enable the driver of the vehicle 200 may intuitively recognize a current state of the stereo camera 195 through the images 1310a, 1320b, and 1330c displayed on the display unit 180.

Figure 14A:
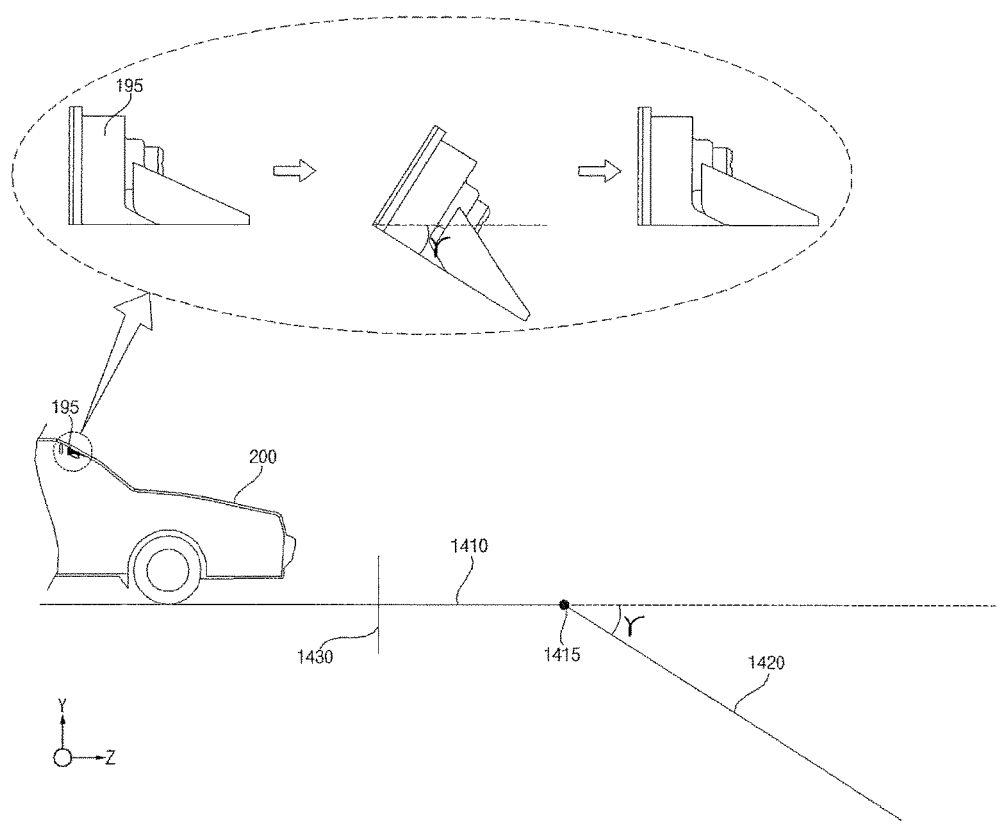
Figure 14B:
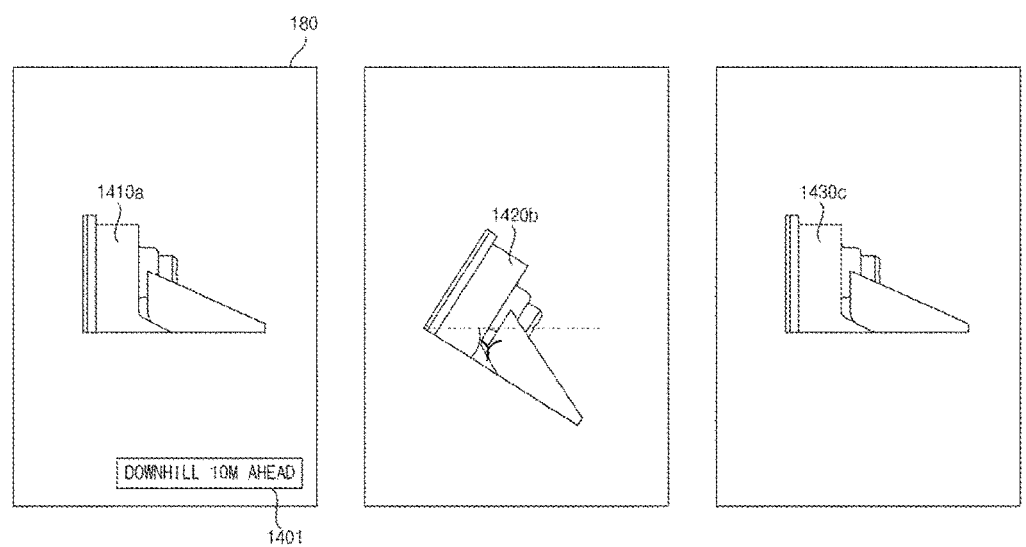

FIGS. 14A and 14B are diagrams illustrating examples of the motions of the stereo camera 195 and the display unit 180 when the vehicle enters a downhill from a level ground.

Referring to the example in FIG. 14A, when the vehicle 200 travels on a level ground 1410 in a positive direction of the Z axis, the processor 170 may determine that a road ahead of the vehicle is a downhill 1420. In this case, the processor 170 may output a control signal to the stereo camera drive unit 196 to control the stereo camera drive unit 196 such that the stereo camera 195 is moved downward. In some implementations, the processor 170 may control the stereo camera 195 to be moved downward in response to a tilt γ of the downhill. For example, the processor 170 may control the stereo camera 195 to be moved downward in proportion to the tilt γ of the downhill. Specifically, the processor 170 may control the stereo camera 195 to be tilted downward in proportion to the tilt γ of the downhill. The processor 170 may control the stereo camera drive unit 196 to control the motion of the stereo camera 195.

In some implementations, when the vehicle 200 travels on the level ground 1410 in the positive direction of the Z axis, the processor 170 may determine that the road ahead of the vehicle is the downhill 1420. In a case in which it is determined that the road ahead of the vehicle is the downhill, the processor 170 determines whether the vehicle has reached a predetermined distance 1430 from an inflection point 1415. The inflection point 1415 may be a start point of the downhill. The processor 170 may set the inflection point 1415 based on the depth map and determine whether the vehicle 200 has reached the predetermined distance 1430 from the inflection point 1415 based on information regarding the distance to the inflection point 1415. The predetermined distance 1430 from the inflection point 1415 may be preset as a point at which the stereo camera 195 can be properly moved.

In a case in which the vehicle 200 has reached the predetermined distance 1430 from the inflection point 1415, the processor 170 may output a control signal to the stereo camera drive unit 196 to control the stereo camera drive unit 196 such that the stereo camera 195 is moved downward. In this case, the processor 170 may control the stereo camera 195 to be moved downward in response to the tilt γ of the downhill. For example, the processor 170 may control the stereo camera 195 to be moved downward in proportion to the tilt γ of the downhill. Specifically, the processor 170 may control the stereo camera 195 to be tilted downward in proportion to the tilt γ of the downhill. The processor 170 may control the stereo camera drive unit 196 to control the motion of the stereo camera 195.

After the vehicle 200 has entered the downhill 1420, the processor 170 may output a control signal to the stereo camera drive unit 196 to control the stereo camera drive unit 196 such that the stereo camera 195 is moved upward. For example, after the vehicle 200 has entered the downhill 1420, the processor 170 may return the stereo camera 195 to the original position thereof. In this case, the processor 170 may return the stereo camera 195 to the original position thereof in response to the traveling speed of the vehicle 200. For example, the processor 170 may return the stereo camera 195 to the original position thereof in proportion to the traveling speed of the vehicle 200. Specifically, the processor 170 may tilt the stereo camera 195 upward to return the stereo camera 195 to the original position thereof in proportion to the traveling speed of the vehicle 200.

Referring to the example in FIG. 14B, when the vehicle 200 travels on the level ground 1410 in the positive direction of the Z axis, the stereo camera 195 assumes an attitude suitable for acquiring images for a view ahead of the vehicle 200. In this case, as shown in the example of the left-most part of FIG. 14B, the processor 170 graphically processes an image 1410a corresponding to the stereo camera 195 which assumes an attitude suitable for acquiring images for a view ahead of the vehicle 200 and displays the graphically-processed image through the display unit 180. In addition, the processor 170 may display information 1401 indicating that there is a downhill predetermined meters ahead of the vehicle on a portion of the display unit 180.

When the vehicle 200 enters the downhill 1420 from the level ground 1210, the processor 170 may output a control signal to the stereo camera drive unit 196 to control the stereo camera drive unit 196 such that the stereo camera 195 is moved downward immediately before the vehicle 200 enters the downhill 1420. For example, as shown in the middle part of FIG. 14B, the processor 170 graphically processes an image 1420b corresponding to the stereo camera 195 which is moved downward and displays the graphically-processed image through the display unit 180.

After the vehicle 200 has entered the downhill 1420, the processor 170 may output a control signal to the stereo camera drive unit 196 to control the stereo camera drive unit 196 such that the stereo camera 195 returns to the original position thereof. For example, as shown in the right-most part of FIG. 14B, the processor 170 graphically processes an image 1430c corresponding to the stereo camera 195 which returns to the original position thereof and displays the graphically-processed image through the display unit 180.

In some implementations, the images 1410a, 1420b, and 1430c corresponding to the stereo camera 195 shown in the examples of FIG. 14B may be three-dimensionally displayed or displayed as a video. Consequently, this may enable the driver of the vehicle 200 may intuitively recognize a current state of the stereo camera 195 through the images 1410a, 1420b, and 1430c displayed on the display unit 180.

Figure 15A:
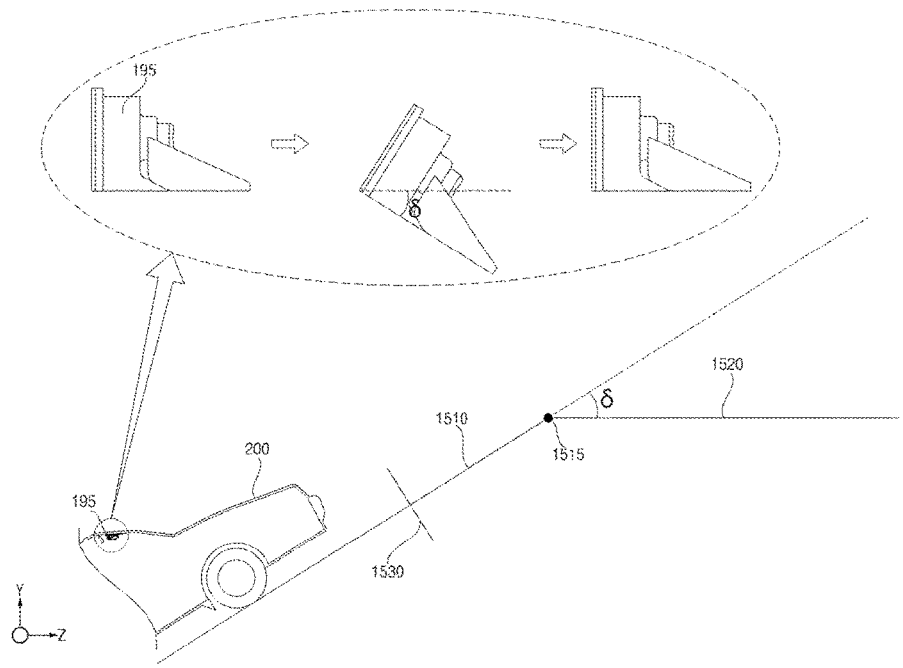
Figure 15B:
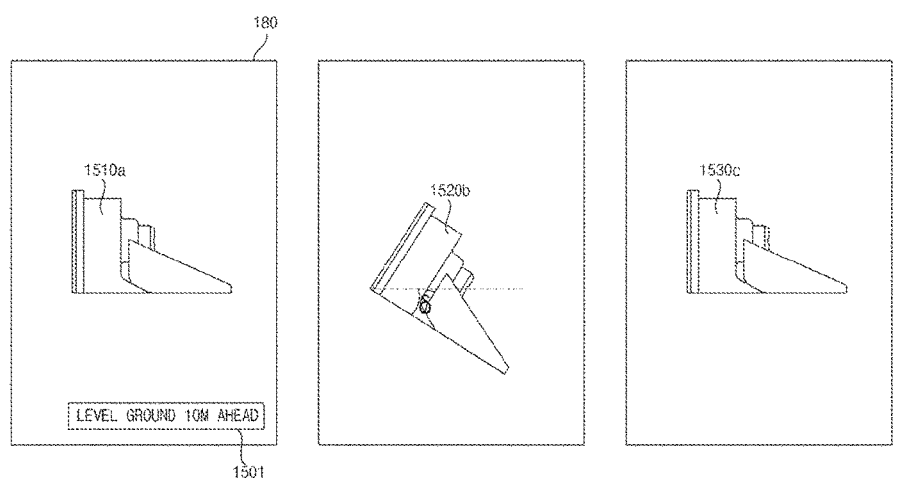

FIGS. 15A and 15B are diagrams illustrating examples of motions of the stereo camera 195 and the display unit 180 when the vehicle enters a level ground from an uphill road.

Referring to the example in FIG. 15A, when the vehicle 200 travels on an uphill 1510 in a positive direction of the Z axis and in a positive direction of the Y axis, the processor 170 may determine that a road ahead of the vehicle is a level ground 1520. The processor 170 may determine the level ground 1520 based on determination as to whether the road ahead of the vehicle is the uphill or the downhill as described above. In this case, the processor 170 may output a control signal to the stereo camera drive unit 196 to control the stereo camera drive unit 196 such that the stereo camera 195 is moved downward. For example, the processor 170 may control the stereo camera 195 to be moved downward in response to a tilt δ of the uphill. As a specific example, the processor 170 may control the stereo camera 195 to be moved downward in response to the tilt δ of the uphill. The processor 170 may control the stereo camera 195 to be tilted downward in response to the tilt δ of the uphill. The processor 170 may control the stereo camera drive unit 196 to control the motion of the stereo camera 195.

In some implementations, when the vehicle 200 travels on the uphill 1510 in the positive direction of the Z axis and in the positive direction of the Y axis, the processor 170 may determine that the road ahead of the vehicle is the level ground 1520. The processor 170 may determine the level ground 1520 based on determination as to whether the road ahead of the vehicle is the uphill or the downhill as described above. In a case in which it is determined that the road ahead of the vehicle is the level ground, the processor 170 determines whether the vehicle has reached a predetermined distance 1530 from an inflection point 1515. The inflection point 1515 may be a start point of the level ground. The processor 170 may set the inflection point 1515 based on the depth map and determine whether the vehicle 200 has reached the predetermined distance 1530 from the inflection point 1515 based on information regarding the distance to the inflection point 1515. In some implementations, the predetermined distance 1530 from the inflection point 1515 may be preset as a point at which the stereo camera 195 can be properly moved.

In a case in which the vehicle 200 has reached the predetermined distance 1530 from the inflection point 1515, the processor 170 may output a control signal to the stereo camera drive unit 196 to control the stereo camera drive unit 196 such that the stereo camera 195 is moved downward. For example, the processor 170 may control the stereo camera 195 to be moved downward in response to the tilt δ of the uphill. As a specific example, the processor 170 may control the stereo camera 195 to be moved downward in response to the tilt δ of the uphill. Specifically, the processor 170 may control the stereo camera 195 to be tilted downward in response to the tilt δ of the uphill. The processor 170 may control the stereo camera drive unit 196 to control the motion of the stereo camera 195.

After the vehicle 200 has entered the level ground 1520, the processor 170 may output a control signal to the stereo camera drive unit 196 to control the stereo camera drive unit 196 such that the stereo camera 195 is moved upward. For example, after the vehicle 200 has entered the level ground 1520, the processor 170 may return the stereo camera 195 to the original position thereof. In this case, the processor 170 may return the stereo camera 195 to the original position thereof in response to the traveling speed of the vehicle 200. For example, the processor 170 may return the stereo camera 195 to the original position thereof in proportion to the traveling speed of the vehicle 200. Specifically, the processor 170 may tilt the stereo camera 195 upward to return the stereo camera 195 to the original position thereof in proportion to the traveling speed of the vehicle 200.

Referring to the example of FIG. 15B, when the vehicle 200 travels on the uphill 1510 in the positive direction of the Z axis and in the positive direction of the Y axis, the stereo camera 195 assumes an attitude suitable for acquiring images for a view ahead of the vehicle 200. In this case, as shown in the example of the left-most part of FIG. 15B, the processor 170 graphically processes an image 1510a corresponding to the stereo camera 195 which assumes an attitude suitable for acquiring images for a view ahead of the vehicle 200 and displays the graphically-processed image through the display unit 180. In addition, the processor 170 may display information 1501 indicating that there is a level ground predetermined meters ahead of the vehicle on a portion of the display unit 180.

When the vehicle 200 enters the level ground 1520 from the uphill 1510, the processor 170 may output a control signal to the stereo camera drive unit 196 to control the stereo camera drive unit 196 such that the stereo camera 195 is moved downward immediately before the vehicle 200 enters the level ground 1520. In this case, as shown in the middle part of FIG. 15B, the processor 170 graphically processes an image 1520b corresponding to the stereo camera 195 which is moved downward and displays the graphically-processed image through the display unit 180.

After the vehicle 200 has entered the level ground 1520, the processor 170 may output a control signal to the stereo camera drive unit 196 to control the stereo camera drive unit 196 such that the stereo camera 195 returns to the original position thereof. In this case, as shown in the right-most part of FIG. 15B, the processor 170 graphically processes an image 1530c corresponding to the stereo camera 195 which returns to the original position thereof and displays the graphically-processed image through the display unit 180.

In some implementations, the images 1510a, 1520b, and 1530c corresponding to the stereo camera 195 shown in FIG. 15B may be three-dimensionally displayed or displayed as a video.

Consequently, this may enable the driver of the vehicle 200 may intuitively recognize a current state of the stereo camera 195 through the images 1510a, 1520b, and 1530c displayed on the display unit 180.

FIGS. 16A and 16B are diagrams illustrating an example of an operation of the driver assistance apparatus in a case in which a road ahead of the vehicle is a curved uphill or a curved downhill road.

Referring to the example of FIG. 16A, the processor 170 may detect lines on the road from the stereo images or the depth maps and create information regarding a curve of the road based on the detected lines.

In a case in which there is an uphill or a downhill of the road ahead of the vehicle in a state in which the uphill or the downhill is curved to the left in a travel direction of the vehicle, the processor 170 detects an outermost one 1620 of the lines ahead of the vehicle. The outermost line 1620 may be a line most distant from a point 1610, which is the center of the curve. The processor 170 may detect a tilt of the outermost line 1620 formed in a positive direction of the Z axis and in a positive direction of the Y axis from the stereo images or the depth maps. The processor 170 may control the stereo camera 195 to be moved upward or downward through control of the stereo camera drive unit 196 in proportion to the tilt of the outermost line 1620.

Referring to the example of FIG. 16B, in a case in which there is an uphill or a downhill of the road ahead of the vehicle in a state in which the uphill or the downhill is curved to the right in a travel direction of the vehicle, the processor 170 detects an outermost one 1640 of the lines ahead of the vehicle. The outermost line 1640 may be a line most distant from a point 1630, which is the center of the curve. The processor 170 may detect a tilt of the outermost line 1640 formed in the positive direction of the Z axis and in the positive direction of the Y axis from the stereo images or the depth maps. The processor 170 may control the stereo camera 195 to be moved upward or downward through control of the stereo camera drive unit 196 in proportion to the tilt of the outermost line 1640.

An operation method of the driver assistance apparatus may be implemented as code that can be written on a program recorded medium and thus read by a computer. The computer-readable medium may be any type of recording device in which data is stored in a computer-readable manner. The computer-readable medium may include, for example, a hard disk drive (HDD), a solid state disk (SSD), a silicon disk drive (SDD), a read only memory (ROM), a random access memory (RAM), a compact disc read only memory (CD-ROM), a magnetic tape, a floppy disk, and an optical data storage device. In addition, the computer-readable medium may be implemented in the form of a carrier wave (for example, a transmission over the Internet). The computer may include the processor 170 or the control unit 770.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A driver assistance apparatus comprising:
   a stereo camera configured to acquire stereo images of a view ahead of a vehicle;
   a stereo camera drive unit configured to drive the stereo camera; and
   at least one processor configured to:
      generate a depth map based on the acquired stereo images; and
      determine whether a road segment that is within the view ahead of the vehicle is an uphill road segment or a downhill road segment based on the generated depth map,
   wherein the at least one processor is configured to control the stereo camera drive unit based on a determination of whether the road segment that is within the view ahead of the vehicle is an uphill road segment or a downhill road segment by:
      determining that the road segment that is within the view ahead of the vehicle is an uphill road segment; and
      based on a determination that the road segment that is within the view ahead of the vehicle is an uphill road segment:
         determining a travelling speed of the vehicle; and
         controlling the stereo camera to be tilted upward at a speed that is proportional to the determined traveling speed of the vehicle,
   wherein the at least one processor is further configured to, based on a determination that the road segment that is within the view ahead of the vehicle is an uphill road segment:
      determine a tilt of the uphill road segment;
      determine that a distance between the vehicle and an inflection point of the uphill road segment is at least a predetermined distance; and
      based on a determination that the distance between the vehicle and the inflection point of the uphill road segment is at least the predetermined distance, control the stereo camera to be tilted upward according to the determined tilt of the uphill road segment.

2. The driver assistance apparatus according to claim 1, wherein the at least one processor is further configured to:
   detect a road surface based on the generated depth map; and
   determine whether the road segment that is within the view ahead of the vehicle is an uphill road segment or a downhill road segment based on the detected road surface.

3. The driver assistance apparatus according to claim 1, wherein the at least one processor is further configured to:
   detect a lane from the stereo images;
   determine a shape of the detected lane; and
   determine whether the road segment that is within the view ahead of the vehicle is an uphill road segment or a downhill road segment based on the determined shape of the detected lane.

4. The driver assistance apparatus according to claim 1, wherein the at least one processor is further configured to:
   determine a disappearance point indicated in the depth map; and
   determine whether the road segment that is within the view ahead of the vehicle is an uphill road segment or a downhill road segment based on the determined disappearance point indicated in the depth map.

5. The driver assistance apparatus according to claim 1, wherein the at least one processor is further configured to:
   detect a plurality of fixed objects around the road segment indicated in the generated depth map; and
   determine whether the road segment that is within the view ahead of the vehicle is an uphill road segment or a downhill road segment based on the detected plurality of fixed objects around the road segment indicated in the generated depth map.

6. The driver assistance apparatus according to claim 1, wherein the at least one processor is further configured to:
   determine that the vehicle has entered the uphill road segment; and
   based on a determination that the vehicle has entered the uphill road segment, control the stereo camera to return to a state in which the stereo camera is not tilted.

7. The driver assistance apparatus according to claim 6, wherein the at least one processor is configured to:
   determine a travelling speed of the vehicle; and control, in proportion to the determined traveling speed of the vehicle and according to the determined tilt of the uphill road segment, a speed of the stereo camera to return to the state in which the stereo camera is not tilted.

8. The driver assistance apparatus according to claim 1, wherein the at least one processor is further configured to:
determine that the road segment that is within the view ahead of the vehicle is a downhill road segment; and
based on a determination that the road segment that is within the view ahead of the vehicle is a downhill road segment:
determine a tilt of the downhill road segment; and
control the stereo camera to be tilted downward according to the determined tilt of the downhill road segment.

9. The driver assistance apparatus according to claim 8, wherein the at least one processor is configured to:
determine that a distance between the vehicle and an inflection point of the downhill road segment is at least a predetermined distance; and
based on a determination that the distance between the vehicle and an inflection point of the downhill road segment is at least a predetermined distance, control the stereo camera to be tilted downward according to the determined tilt of the downhill road segment.

10. The driver assistance apparatus according to claim 8, wherein:
the at least one processor is configured to determine that the vehicle has entered the downhill road segment, and
the stereo camera drive unit is configured to, based on a determination that the vehicle has entered the downhill road segment, drive the stereo camera to return to a state in which the stereo camera is not tilted.

11. The driver assistance apparatus according to claim 10, wherein the at least one processor is configured to:
determine a travelling speed of the vehicle; and
control, according to the determined tilt of the downhill road segment or in proportion to the determined traveling speed of the vehicle, the stereo camera to return to the state in which the stereo camera is not tilted.

12. The driver assistance apparatus according to claim 1, wherein the at least one processor is further configured to:
determine that the road segment that is within the view ahead of the vehicle is a downhill road segment; and
based on a determination that the road segment that is within the view ahead of the vehicle is a downhill road segment:
determine a travelling speed of the vehicle; and
control the stereo camera to be tilted downward at a speed that is proportional to the determined traveling speed of the vehicle.

13. The driver assistance apparatus according to claim 1, wherein the at least one processor is further configured to:
detect lines in the acquired stereo images; and
generate, based on the detected lines, information regarding a curve of the road segment that is within the view ahead of the vehicle.

14. The driver assistance apparatus according to claim 1, further comprising a display unit configured to output information regarding the determined uphill road segment or the determined downhill road segment that is within the view ahead of the vehicle.

15. The driver assistance apparatus according to claim 1, further comprising:
a first memory, wherein
the at least one processor is further configured to cumulatively store, in the first memory, information regarding a state of the vehicle based on the determined uphill road segment or the determined downhill road segment that is within the view ahead of the vehicle.

16. A vehicle comprising:
a first memory;
a power source drive unit configured to control an output of an engine of the vehicle, wherein the output of the engine is configured to limit a speed of the vehicle;
a brake drive unit configured to drive a brake of the vehicle;
a stereo camera configured to acquire stereo images for a view ahead of the vehicle;
at least one processor configured to:
generate a depth map based on the acquired stereo images;
determine, based on the generated depth map, whether a road segment that is within the view ahead of the vehicle is an uphill road segment or a downhill road segment;
generate road surface information based on the acquired stereo images; and
output a control signal configured to control the brake drive unit based on the determined uphill road segment or the determined downhill road segment that is within the view ahead of the vehicle and based on the generated road surface information; and
a slip determination unit configured to determine a slip degree of the vehicle,
wherein the at least one processor is further configured to output the control signal to control the brake drive unit of the vehicle based on the determined uphill road segment or the determined downhill road segment that is within the view ahead of the vehicle and based on the determined slip degree of the vehicle,
wherein the at least one processor is further configured to:
cumulatively store, in the first memory, information regarding the determined uphill road segment or the determined downhill road segment that is within the view ahead of the vehicle;
apply a Kalman filter to the cumulatively stored information regarding the determined uphill road segment or the determined downhill road segment;
estimate the slip degree of the vehicle based on an application of the Kalman filter to the cumulatively stored information regarding the determined uphill road segment or the determined downhill road segment; and
output the control signal to control, based on the estimated slip degree of the vehicle, the power source drive unit or the brake drive unit to drive the brake of the vehicle at a level equivalent to 90% or less than a full brake level.

17. The vehicle according to claim 16, further comprising:
a navigation system configured to provide a map and information regarding a position of the vehicle on the map, wherein
the at least one processor is configured to:
receive, from the navigation system, information regarding the road segment on which the vehicle is traveling excluding a region of the road segment displayed in the stereo images; and
estimate, based on the received information regarding the road segment on which the vehicle is traveling excluding a region of the road segment displayed in the stereo images, a state of the road segment.

18. A driver assistance method comprising:
acquiring, by a stereo camera of a vehicle, stereo images of a view ahead of the vehicle;
generating a depth map based on the acquired stereo images;
determining whether a road segment that is within the view ahead of the vehicle is an uphill road segment or a downhill road segment based on the generated depth map; and
controlling a stereo camera drive unit to drive the stereo camera, based on a determination of whether the road segment that is within the view ahead of the vehicle is an uphill road segment or a downhill road segment,
wherein controlling the stereo camera drive unit to drive the stereo camera comprises:
based on a determination that the road segment that is within the view ahead of the vehicle is an uphill road segment:
determining that a distance between the vehicle and an inflection point of the uphill road segment is at least a predetermined distance; and
based on a determination that the distance between the vehicle and the inflection point of the uphill road segment is at least the predetermined distance, driving the stereo camera to be tilted upward according to a tilt of the uphill road segment.

19. The driver assistance method according to claim 18, wherein determining whether a road segment that is within the view ahead of the vehicle is an uphill road segment or a downhill road segment based on the generated depth map comprises:
detecting a road surface from the generated depth map; and
determining whether the road segment that is within the view ahead of the vehicle is an uphill road segment or a downhill road segment based on the detected road surface.

20. The driver assistance method according to claim 18, wherein determining whether a road segment that is within the view ahead of the vehicle is an uphill road segment or a downhill road segment based on the generated depth map comprises:
detecting a lane from the stereo images;
determining a shape of the detected lane; and
determining whether the road segment that is within the view ahead of the vehicle is an uphill road segment or a downhill road segment based on the determined shape of the detected lane.

21. The driver assistance method according to claim 18, wherein determining whether a road segment that is within the view ahead of the vehicle is an uphill road segment or a downhill road segment based on the generated depth map comprises:
determining a disappearance point indicated in the depth map; and
determining whether the road segment that is within the view ahead of the vehicle is an uphill road segment or a downhill road segment based on the determined disappearance point indicated in the depth map.

22. The driver assistance method according to claim 18, wherein determining whether a road segment that is within the view ahead of the vehicle is an uphill road segment or a downhill road segment based on the generated depth map comprises:
detecting a plurality of fixed objects around the road segment indicated in the depth map; and
determining whether the road segment that is within the view ahead of the vehicle is an uphill road segment or a downhill road segment based on the detected plurality of fixed objects around the road segment indicated in the depth map.

23. The driver assistance method according to claim 18, further comprising:
determining that the road segment that is within the view ahead of the vehicle is an uphill road segment; and
based on a determination that the road segment that is within the view ahead of the vehicle is an uphill road segment, determining a tilt of the uphill road segment, wherein
controlling the stereo camera drive unit to drive the stereo camera comprises driving the stereo camera to be tilted upward according to the determined tilt of the uphill road segment.

24. The driver assistance method according to claim 23, wherein controlling the stereo camera drive unit to drive the stereo camera comprises:
determining that the vehicle has entered the uphill road segment; and
based on a determination that the vehicle has entered the uphill road segment, driving the stereo camera to return to a state in which the stereo camera is not tilted.

25. The driver assistance method according to claim 24, wherein controlling the stereo camera drive unit to drive the stereo camera comprises:
determining a travelling speed of the vehicle; and
driving, in proportion to the determined traveling speed of the vehicle and according to the determined tilt of the uphill road segment, the stereo camera to return to the state in which the stereo camera is not tilted.

26. The driver assistance method according to claim 18, wherein controlling the stereo camera drive unit to drive the stereo camera comprises:
determining that the road segment that is within the view ahead of the vehicle is an uphill road segment; and
based on a determination that the road segment that is within the view ahead of the vehicle is an uphill road segment:
determining a travelling speed of the vehicle; and
driving the stereo camera to be tilted upward at a speed that is proportional to the determined traveling speed of the vehicle.

27. The driver assistance method according to claim 18, further comprising:
determining that the road segment that is within the view ahead of the vehicle is a downhill road segment; and
based on a determination that the road segment that is within the view ahead of the vehicle is a downhill road segment, determining a tilt of the downhill road segment, wherein
controlling the stereo camera drive unit to drive the stereo camera comprises driving the stereo camera to be tilted downward according to the determined tilt of the downhill road segment.

28. The driver assistance method according to claim 27, wherein controlling the stereo camera drive unit to drive the stereo camera comprises:
determining that a distance between the vehicle and an inflection point of the downhill road segment is at least a predetermined distance; and
based on a determination that the distance between the vehicle and an inflection point of the downhill road segment is at least a predetermined distance, driving the stereo camera to be tilted downward according to the determined tilt of the downhill road segment.

29. The driver assistance method according to claim 27, wherein controlling the stereo camera drive unit to drive the stereo camera comprises:
  determining that the vehicle has entered the downhill road segment; and
  based on a determination that the vehicle has entered the downhill road segment, driving the stereo camera to return to a state in which the stereo camera is not tilted.

30. The driver assistance method according to claim 29, wherein controlling the stereo camera drive unit to drive the stereo camera comprises:
  determining a travelling speed of the vehicle; and
  driving, according to the determined tilt of the downhill road segment or in proportion to the determined traveling speed of the vehicle, the stereo camera to return to the state in which the stereo camera is not tilted.

31. The driver assistance method according to claim 18, wherein controlling the stereo camera drive unit to drive the stereo camera comprises:
  determining that the road segment that is within the view ahead of the vehicle is a downhill road segment; and
  based on a determination that the road segment that is within the view ahead of the vehicle is a downhill road segment:
    determining a travelling speed of the vehicle; and
    driving the stereo camera to be tilted downward at a speed that is proportional to the determined traveling speed of the vehicle.

32. The driver assistance method according to claim 18, further comprising:
  detecting lines in the acquired stereo images; and
  generating, based on the detected lines, information regarding a curve of the road segment that is within the view ahead of the vehicle.

33. The driver assistance method according to claim 18, further comprising outputting, to a display unit, information regarding the determined uphill road segment or the determined downhill road segment that is within the view ahead of the vehicle.

34. The driver assistance method according to claim 18, further comprising cumulatively storing, in a first memory, information regarding a state of the vehicle based on the determined uphill road segment or the determined downhill road segment that is within the view ahead of the vehicle.

35. The driver assistance method according to claim 18, further comprising:
  controlling a brake drive unit to drive a brake of the vehicle;
  generating road surface information based on the acquired stereo images; and
  outputting a control signal configured to control the brake drive unit based on the determined uphill road segment or the determined downhill road segment that is within the view ahead of the vehicle and based on the generated road surface information.

36. The driver assistance method according to claim 35, further comprising:
  receiving, from a navigation system that is configured to provide a map and information regarding a position of the vehicle on the map, information regarding the road segment on which the vehicle is traveling excluding a region of the road segment displayed in the stereo images from a navigation system; and
  estimating, based on the received information regarding the road segment on which the vehicle is traveling excluding a region of the road segment displayed in the stereo images, a state of the road segment.

37. The driver assistance method according to claim 35, further comprising:
  determining a slip degree of the vehicle, wherein
  outputting a control signal configured to control the brake drive unit based on the determined uphill road segment or the determined downhill road segment that is within the view ahead of the vehicle and based on the generated road surface information comprises:
    outputting the control signal to control the brake drive unit of the vehicle based on the determined uphill road segment or the determined downhill road segment that is within the view ahead of the vehicle and based on the determined slip degree of the vehicle.

38. The driver assistance method according to claim 37, further comprising:
  controlling an output of an engine of the vehicle through a power source drive unit of the vehicle, wherein the output of the engine is configured to limit a speed of the vehicle;
  cumulatively storing, in a first memory, information regarding the determined uphill road segment or the determined downhill road segment that is within the view ahead of the vehicle;
  applying a Kalman filter to the cumulatively stored information regarding the determined uphill road segment or the determined downhill road segment; and
  estimating the slip degree of the vehicle based on an application of the Kalman filter to the cumulatively stored information regarding the determined uphill road segment or the determined downhill road segment, wherein
  outputting a control signal configured to control the brake drive unit based on the determined uphill road segment or the determined downhill road segment that is within the view ahead of the vehicle and based on the generated road surface information comprises:
    outputting the control signal to control, based on the estimated slip degree of the vehicle, the power source drive unit or the brake drive unit to drive the brake of the vehicle at a level equivalent to 90% or less than a full brake level.

\* \* \* \* \*